US012261377B2

(12) United States Patent
Wang et al.

(10) Patent No.: US 12,261,377 B2
(45) Date of Patent: Mar. 25, 2025

(54) ANTENNA AND DISPLAY APPARATUS

(71) Applicants: Beijing BOE Technology Development Co., Ltd., Beijing (CN); BOE Technology Group Co., Ltd., Beijing (CN)

(72) Inventors: Yali Wang, Beijing (CN); Feng Qu, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/904,255

(22) PCT Filed: Nov. 17, 2021

(86) PCT No.: PCT/CN2021/131070
§ 371 (c)(1),
(2) Date: Aug. 15, 2022

(87) PCT Pub. No.: WO2023/087161
PCT Pub. Date: May 25, 2023

(65) Prior Publication Data
US 2024/0204409 A1 Jun. 20, 2024

(51) Int. Cl.
*H01Q 9/04* (2006.01)
*H01Q 1/22* (2006.01)

(52) U.S. Cl.
CPC ............ *H01Q 9/0407* (2013.01); *H01Q 1/22* (2013.01)

(58) Field of Classification Search
CPC ........ H01Q 9/0407; H01Q 1/22; H01Q 5/371; H01Q 5/364; H01Q 9/40
See application file for complete search history.

(56) References Cited

U.S. PATENT DOCUMENTS 5,241,321 A * 8/1993 Tsao .................... H01Q 9/0442 343/848
5,243,353 A * 9/1993 Nakahara ............ H01Q 9/0414 343/846
(Continued)

FOREIGN PATENT DOCUMENTS

CN 101572354 A * 11/2009
CN 204103041 U 1/2015
(Continued)

OTHER PUBLICATIONS

International Search Report & Written Opinion mailed Aug. 8, 2022, regarding PCT/CN2021/131070.

*Primary Examiner* — Ricardo I Magallanes
*Assistant Examiner* — Jordan E. DeWitt
(74) *Attorney, Agent, or Firm* — Intellectual Valley Law, P.C.

(57) ABSTRACT

An antenna is provided. The antenna includes a ground plate; a dielectric layer on the ground plate; and a microstrip feed line and a radiating patch on a side of the dielectric layer away from the ground plate, the radiating patch being coupled to the microstrip feed line and configured to receive a signal from the microstrip feed line. The radiating patch includes a main body having a parallelogram shape with a first notch truncating a corner of the parallelogram shape, at least a portion of the main body truncated by the first notch having an arc-shaped contour line. The radiating patch further includes a first branch structure.

20 Claims, 36 Drawing Sheets

(56) References Cited

U.S. PATENT DOCUMENTS

| | | | | | |
|---|---|---|---|---|---|
| 5,418,541 | A * | 5/1995 | Schroeder | H01Q 21/061 | 343/770 |
| 5,661,494 | A | 8/1997 | Bondyopadhyay | | |
| 5,940,037 | A * | 8/1999 | Kellerman | H01Q 1/42 | 343/700 MS |
| 6,061,025 | A * | 5/2000 | Jackson | H01Q 9/0421 | 343/745 |
| 6,288,677 | B1 * | 9/2001 | Fink | H01Q 9/0435 | 343/700 MS |
| 6,518,924 | B1 * | 2/2003 | Desclos | H01Q 9/0407 | 343/846 |
| 2003/0174095 | A1 * | 9/2003 | Sievenpiper | H01Q 13/18 | 343/770 |
| 2006/0139215 | A1 * | 6/2006 | Heiniger | H01Q 9/0407 | 343/700 MS |
| 2007/0257843 | A1 * | 11/2007 | Gooshchin | H01Q 5/25 | 343/700 MS |
| 2008/0238781 | A1 | 10/2008 | Su et al. | | |
| 2009/0231207 | A1 * | 9/2009 | De Vita | H01Q 9/0407 | 343/700 MS |
| 2010/0013716 | A1 * | 1/2010 | Yen | H01Q 9/36 | 343/846 |
| 2012/0319922 | A1 * | 12/2012 | Fuchs | H01Q 1/3275 | 343/872 |
| 2013/0027253 | A1 * | 1/2013 | Lin | H01Q 9/0428 | 343/700 MS |
| 2013/0321214 | A1 * | 12/2013 | Zhou | H01Q 9/0428 | 343/700 MS |
| 2015/0357714 | A1 * | 12/2015 | Ng | H01Q 1/3275 | 343/848 |
| 2018/0034567 | A1 * | 2/2018 | Deriso | G06F 11/261 | |
| 2020/0300901 | A1 * | 9/2020 | Murata | G01R 29/0885 | |
| 2023/0344132 | A1 * | 10/2023 | Wang | H01Q 5/364 | |
| 2024/0204409 | A1 * | 6/2024 | Wang | H01Q 9/0428 | |

FOREIGN PATENT DOCUMENTS

| | | | | | |
|---|---|---|---|---|---|
| CN | 102800958 | B | | 5/2015 | |
| CN | 104934714 | A | * | 9/2015 | |
| CN | 209344327 | U | * | 9/2019 | |
| CN | 108832280 | B | | 10/2019 | |
| CN | 210430106 | U | | 4/2020 | |
| CN | 112216971 | A | | 1/2021 | |
| CN | 112259968 | A | * | 1/2021 | H01Q 1/48 |
| CN | 112886221 | A | * | 6/2021 | |
| CN | 116130946 | A | * | 5/2023 | |
| JP | 2002198724 | A | | 7/2002 | |
| KR | 100762217 | B1 | | 10/2007 | |
| WO | WO-2023087161 | A1 | * | 5/2023 | H01Q 1/22 |
| WO | WO-2023087162 | A1 | * | 5/2023 | H01Q 1/22 |

* cited by examiner

ANTENNA AND DISPLAY APPARATUS

CROSS-REFERENCE TO RELATED APPLICATION

This application is a national stage application under 35 U.S.C. § 371 of International Application No. PCT/CN2021/131070, filed Nov. 17, 2021, the contents of which are incorporated by reference in the entirety.

TECHNICAL FIELD

The present invention relates to an antenna and a display apparatus.

BACKGROUND

Circular polarization of an antenna refers to the polarization of a radiofrequency signal that is split into two equal amplitude components that are in phase quadrature and are spatially oriented perpendicular to each other and to the direction of propagation.

SUMMARY

In one aspect, the present disclosure provides an antenna, comprising a ground plate; a dielectric layer on the ground plate; and a microstrip feed line and a radiating patch on a side of the dielectric layer away from the ground plate, the radiating patch being coupled to the microstrip feed line and configured to receive a signal from the microstrip feed line; wherein the radiating patch comprises a main body having a parallelogram shape with a first notch truncating a corner of the parallelogram shape, at least a portion of the main body truncated by the first notch having an arc-shaped contour line; and the radiating patch further comprises a first branch structure.

Optionally, an orthographic projection of the ground plate on the dielectric layer at least partially overlaps with an orthographic projection of the microstrip feed line on the dielectric layer.

Optionally, the first branch structure extends from a side of the parallelogram shape that is not truncated by the first notch.

Optionally, the first notch truncates a first side and a second side of the parallelogram shape; the first branch structure extends from a third side of the parallelogram shape; and the second side connects the first side to the third side.

Optionally, the first branch structure comprises a first branch connected to the main body and a second branch connected to the first branch; the first branch is elongated in a first longitudinal direction; and the second branch is elongated in a second longitudinal direction different from the first longitudinal direction.

Optionally, the first longitudinal direction is perpendicular to a side of the main body connected to the first branch; and the second longitudinal direction is perpendicular to the first longitudinal direction.

Optionally, the antenna further comprises a second branch structure; wherein the first branch structure and the second branch structure are connected to two opposite sides of the main body.

Optionally, the first branch structure has a T shape.

Optionally, the first branch structure has a T shape; and the second branch structure has a L shape.

Optionally, wherein the first notch has a partial circle shape.

Optionally, the main body has the parallelogram shape with the first notch truncating a first corner of the parallelogram shape, and a second notch truncating a second corner of the parallelogram shape.

Optionally, the first corner and the second corner are opposite to each other.

Optionally, the second notch has a triangular shape.

Optionally, the first notch truncates a first side and a second side of the parallelogram shape; the first branch structure extends from a third side of the parallelogram shape; the second side connects the first side to the third side; and the second notch truncates the third side of the parallelogram shape.

Optionally, the antenna further comprises a first ring-shaped groove extending through the main body.

Optionally, a virtual extension of the microstrip feed line partitions the parallelogram shape into two portions; and the first ring-shaped groove extends through a portion of the parallelogram shape that is truncated by the first notch.

Optionally, the antenna further comprises a second ring-shaped groove extending through the main body; wherein a virtual extension of the microstrip feed line partitions the parallelogram shape into two portions; the first ring-shaped groove extends through a first portion of the parallelogram shape that is truncated by the first notch; and the second ring-shaped groove extends through a second portion of the parallelogram shape different from the first portion.

Optionally, the antenna further comprises an impedance transformation structure configured to perform impedance matching; wherein the impedance transformation structure connects the microstrip feed line to the radiating patch.

Optionally, the impedance transformation structure has a trapezoidal shape having a long side connected to the radiating patch and a short side connected to the microstrip feed line.

Optionally, the impedance transformation structure, the microstrip feed line, and the radiating patch are parts of a unitary structure.

In another aspect, the present disclosure provides an electronic apparatus, comprising the antenna described herein.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, an antenna and a display apparatus that substantially obviate one or more of the problems due to limitations and disadvantages of the related art. In one aspect, the present disclosure provides an antenna. In some embodiments, the antenna includes a ground plate; a dielectric layer on the ground plate; and a microstrip feed line and a radiating patch on a side of the dielectric layer away from the ground plate, the radiating patch being coupled to the microstrip feed line and configured to receive a signal from the microstrip feed line. Optionally, the radiating patch comprises a main body having a parallelogram shape with a first notch truncating a corner of the parallelogram shape, at least a portion of the main body truncated by the first notch having an arc-shaped contour line. Optionally, the radiating patch further comprises a first branch structure.

Figure 1A:
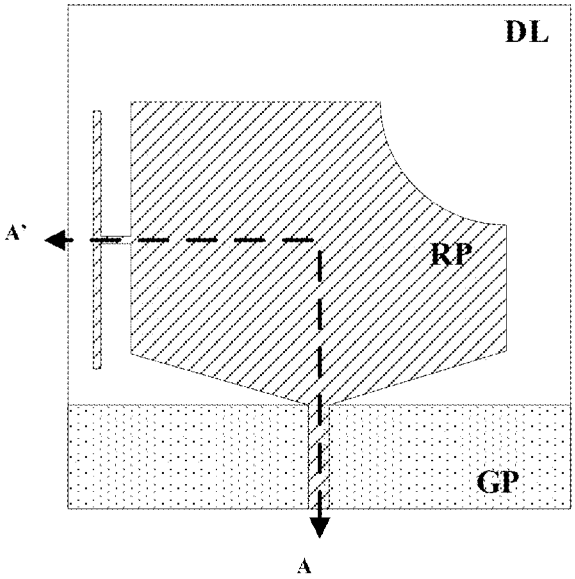
FIG. 1A is a plan view of an antenna in some embodiments according to the present disclosure.
Figure 1B:
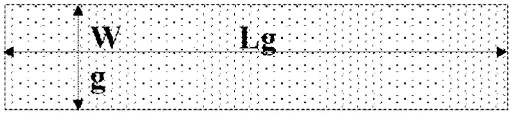
FIG. 1B illustrates the structure of a ground plate in an antenna depicted in FIG. 1A.
Figure 1C:
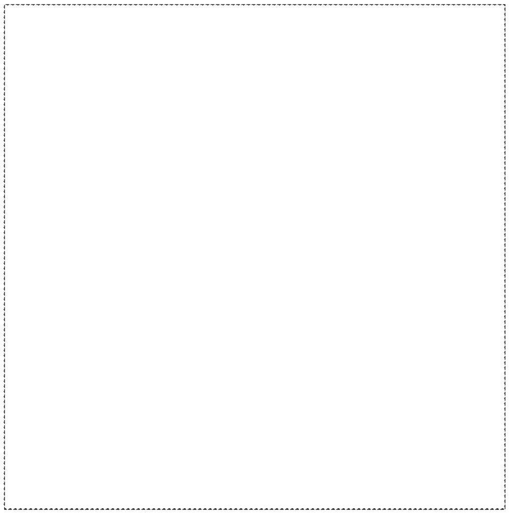
FIG. 1C illustrates the structure of a dielectric layer in an antenna depicted in FIG. 1A.
Figure 1D:
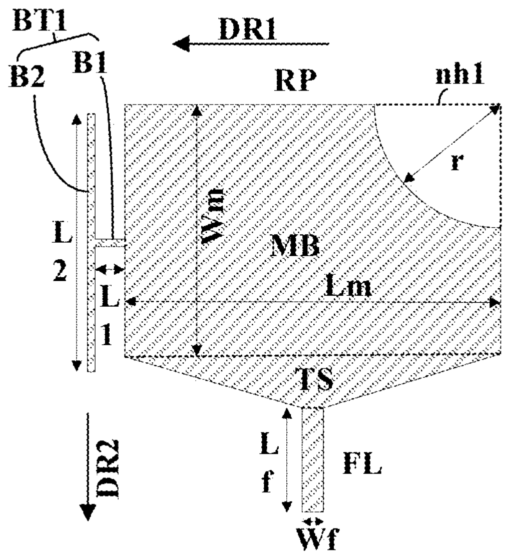
FIG. 1D illustrates the structure of a radiating patch, a microstrip feed line, and an impedance transformation structure in an antenna depicted in FIG. 1A.
Figure 1E:
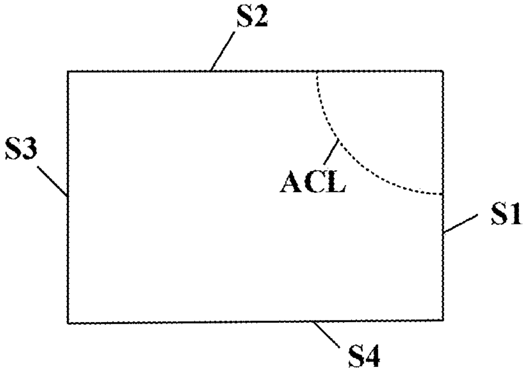
FIG. 1E illustrates a parallelogram shape of a main body of an antenna depicted in FIG. 1A.
Figure 2:
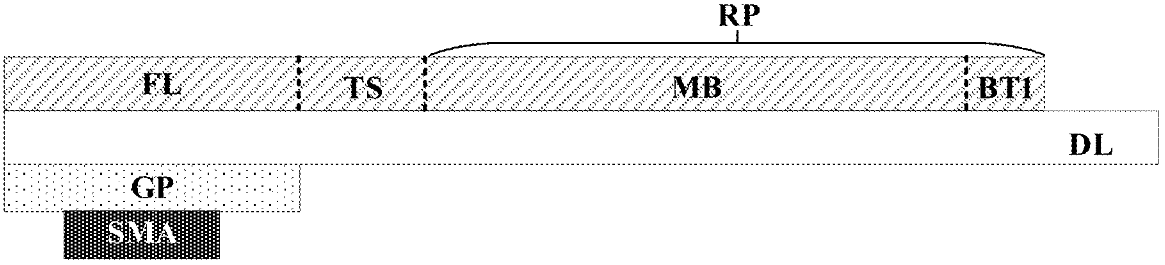
FIG. 2 is a cross-sectional view of along an A-A' line in FIG. 1A.

FIG. 1A is a plan view of an antenna in some embodiments according to the present disclosure. FIG. 1B illustrates the structure of a ground plate in an antenna depicted in FIG. 1A. FIG. 1C illustrates the structure of a dielectric layer in an antenna depicted in FIG. 1A. FIG. 1D illustrates the structure of a radiating patch, a microstrip feed line, and an impedance transformation structure in an antenna depicted in FIG. 1A. FIG. 1E illustrates a parallelogram shape of a main body of an antenna depicted in FIG. 1A. FIG. 2 is a cross-sectional view of along an A-A' line in FIG. 1A. Referring to FIG. 1A to FIG. 1E, and FIG. 2, the antenna in some embodiments includes a ground plate GP; a dielectric layer DL on the ground plate GP; and a microstrip feed line FL and a radiating patch RP on a side of the dielectric layer DL away from the ground plate GP, the radiating patch RP being coupled to the microstrip feed line FL and configured to receive a signal from the microstrip feed line FL. Optionally, the radiating patch RP includes a main body MB having a parallelogram shape with a first notch nh1 truncating a corner of the parallelogram shape, at least a portion of the main body truncated by the first notch nh1 having an arc-shaped contour line.

In some embodiments, the antenna further includes a radio-frequency connector SMA configured to receive an external radio-frequency signal. Optionally, the radio-frequency connector SMA is connected to the microstrip feed line FL, and coupled to the radiating patch RP through the microstrip feed line FL.

In some embodiments, the antenna further includes impedance transformation structure TS configured to perform impedance matching. The impedance transformation structure TS connects the microstrip feed line FL to the radiating patch RP.

As shown in FIG. 2, in some embodiments, an orthographic projection of the ground plate GP on the dielectric layer DL at least partially overlaps with an orthographic projection of the microstrip feed line FL on the dielectric layer DL. In one example, the orthographic projection of the ground plate GP on the dielectric layer DL covers at least 50% (e.g., at least 55%, at least 60%, at least 65%, at least 70%, at least 75%, at least 80%, at least 85%, at least 90%, at least 95%, at least 99%, or 100%) of the orthographic projection of the microstrip feed line FL on the dielectric layer DL. In some embodiments, the orthographic projection of the ground plate GP on the dielectric layer DL is at least partially non-overlapping with an orthographic projection of the impedance transformation structure TS on the dielectric layer DL. In one example, the orthographic projection of the ground plate GP on the dielectric layer DL is at least 50% (e.g., at least 55%, at least 60%, at least 65%, at least 70%, at least 75%, at least 80%, at least 85%, at least 90%, at least 95%, at least 99%, or 100%) non-overlapping with the orthographic projection of the impedance transformation structure TS on the dielectric layer DL. In some embodiments, the orthographic projection of the ground plate GP on the dielectric layer DL is at least partially non-overlapping with an orthographic projection of the radiating patch RP on the dielectric layer DL. In one example, the orthographic projection of the ground plate GP on the dielectric layer DL is at least 50% (e.g., at least 55%, at least 60%, at least 65%, at least 70%, at least 75%, at least 80%, at least 85%, at least 90%, at least 95%, at least 99%, or 100%) non-overlapping with the orthographic projection of the radiating patch RP on the dielectric layer DL.

Referring to FIG. 1E, the main body of the radiating patch has a parallelogram shape with a first notch nh1 truncating a corner of the parallelogram shape. Various appropriate parallelogram shapes may be implemented in the present radiating patches. In one example, the parallelogram shapes with the notches are rectangles with notches. In another example, the parallelogram shapes with the notches are squares with notches.

The notches may have various appropriate shapes. Examples of appropriate shapes of the notches include a triangular shape, a square shape, a rectangular shape, a L shape, a polygon shape, an irregular polygon shape, and so on. In some embodiments, at least a portion of the main body truncated by the first notch having an arc-shaped contour line ACL. In one example, the first notch has a partial circle shape, and the arc-shaped contour line ACL is a partial circle arc line. In another example, the first notch has a quarter circle shape, and the arc-shaped contour line ACL is a quarter circle arc line.

Referring to FIG. 1D and FIG. 2, the radiating patch RP in some embodiments further includes a first branch structure BT1. The first branch structure BT1 extends from a side of the parallelogram shape that is not truncated by the first notch nh1. Referring to FIG. 1D, FIG. 1E, and FIG. 2, in some embodiments, the first notch nh1 truncates a first side S1 and a second side S2 of the parallelogram shape. The first branch structure BT1 extends from a third side S3 of the parallelogram shape. The second side S2 connects the first side S1 to the third side S3.

In some embodiments, the first branch structure BT1 extends from a side of the parallelogram shape that is not truncated by the first notch nh1, and is not a side where the impedance transformation structure TS connects to the radiating patch RP. Referring to FIG. 1D, FIG. 1E, and FIG. 2, the first notch nh1 truncates a first side S1 and a second side S2 of the parallelogram shape, the impedance transformation structure TS connects to a fourth side D4 of the radiating patch RP, and the first branch structure BT1 extends from a third side S3 of the parallelogram shape.

Figure 4A:
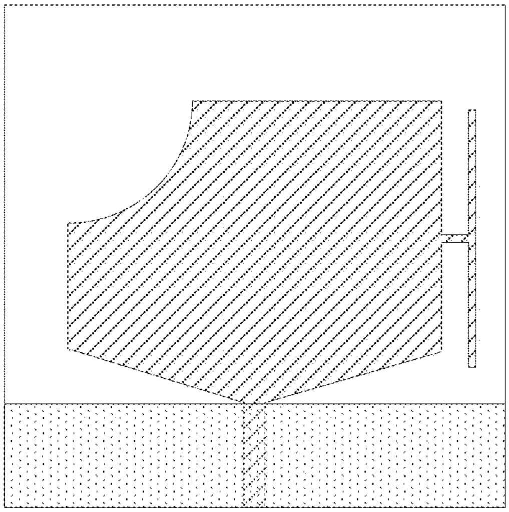
FIG. 4A is a plan view of an antenna in some embodiments according to the present disclosure.
Figure 4B:
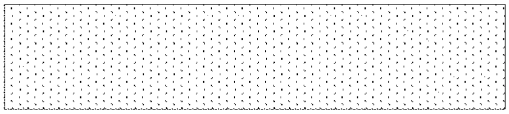
FIG. 4B illustrates the structure of a ground plate in an antenna depicted in FIG. 4A.
Figure 4C:
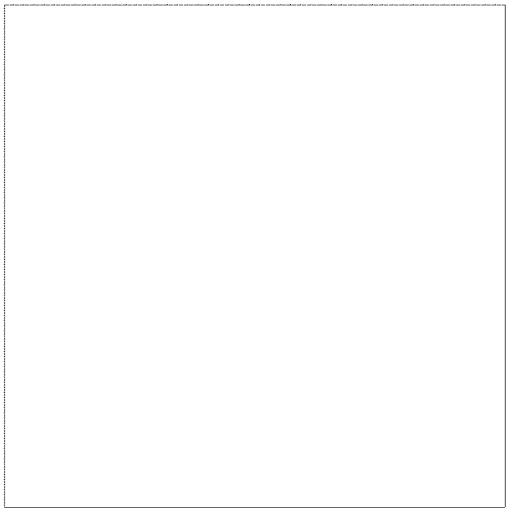
FIG. 4C illustrates the structure of a dielectric layer in an antenna depicted in FIG. 4A.
Figure 4D:
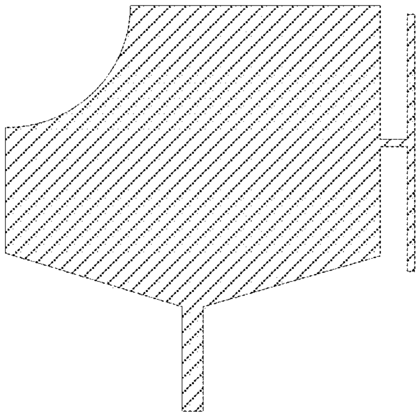
FIG. 4D illustrates the structure of a radiating patch, a microstrip feed line, and an impedance transformation structure in an antenna depicted in FIG. 4A.
Figure 4E:
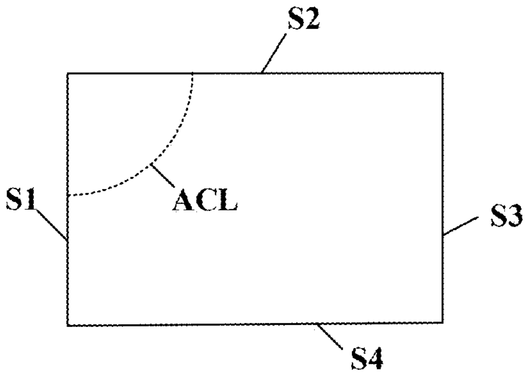
FIG. 4E illustrates a parallelogram shape of a main body of an antenna depicted in FIG. 4A.

In some embodiments, the first branch structure BT1 extends from a side opposite to a side truncated by the first notch nh1. FIG. 4A is a plan view of an antenna in some embodiments according to the present disclosure. FIG. 4B illustrates the structure of a ground plate in an antenna depicted in FIG. 4A. FIG. 4C illustrates the structure of a dielectric layer in an antenna depicted in FIG. 4A. FIG. 4D illustrates the structure of a radiating patch, a microstrip feed line, and an impedance transformation structure in an antenna depicted in FIG. 4A. FIG. 4E illustrates a parallelogram shape of a main body of an antenna depicted in FIG. 4A. Referring to FIG. 1E and FIG. 4E, in both examples, the first branch structure BT1 extends from the third side S3 of the parallelogram shape. The third side S3 of the parallelogram shape is not truncated by the first notch nh1. The third side S3 is opposite to the first side S1, which is a side that is truncated by the first notch nh1. The structure of the antenna depicted in FIG. 1A and FIG. 4A differ from each other in that the first notch nh1 truncates an upper right corner of the parallelogram shape in FIG. 1A whereas the first notch nh1 truncates an upper left corner of the parallelogram shape in FIG. 4A. The relative position of the first notch nh1 and the first branch structure BT1 remains the same in both FIG. 1A and FIG. 4A.

Referring to FIG. 1D, the first branch structure BT1 in some embodiments includes a first branch B1 connected to the main body MB and a second branch B2 connected to the first branch B1. The first branch B1 is elongated in a first longitudinal direction DR1; and the second branch B2 is elongated in a second longitudinal direction DR2 different from the first longitudinal direction DR1. Optionally, the first longitudinal direction DR1 is perpendicular to the second longitudinal direction DR2.

Optionally, the first branch structure BT1 has a T shape. In some embodiments, the first longitudinal direction DR1 is perpendicular to a side of the main body MB connected to the first branch B1; and the second longitudinal direction DR2 is perpendicular to the first longitudinal direction DR1. Referring to FIG. 1D and FIG. 1E, the second longitudinal direction DR2 in one example is parallel to the first side S1 or the third side D3, and the first longitudinal direction DR1 in one example is parallel to the second side S2 or the fourth side S4.

The present antenna is configured to be a right-handed circularly polarized antenna. The inventors of the present disclosure further discover that, surprisingly and unexpectedly, the size, width, length, and/or shape of various components of the antenna are critical in achieving the right-handed circularly polarized bidirectional radiation.

In some embodiments, the parallelogram shape has a length Lm and a width Wm, and the arc-shaped contour line ACL has a radius of r. Optionally, a ratio of the radius r to the width Wm is in a range of 1:4 to 3:4, e.g., 1:4 to 1:3.5, 1:3.5 to 1:3, 1:3 to 1:2.5, 1:2.5 to 1:2, 1:2 to 1:1.5, or 1:1.5 to 3:4. In one example, the ratio of the radius r to the width Wm is 1:2. Optionally, a ratio of the radius r to the length Lm is in a range of 1:6 to 1:2, e.g., 1:6 to 1:5.25, 1:5.25 to 1:4.5, 1:4.5 to 1:3.75, 1:3.75 to 1:3, 1:3 to 1:2.25, or 1:2.25 to 1:2. In one example, the ratio of the radius r to the width Wm is 1:3.

Optionally, the length Lm is in a range of 25 mm to 45 mm, e.g., 25 mm to 30 mm, 30 mm to 35 mm, 35 mm to 40 mm, or 40 mm to 45 mm. In one example, the length Lm is 36 mm. Optionally, the width Wm is in a range of 15 mm to 35 mm, e.g., 15 mm to 20 mm, 20 mm to 25 mm, 25 mm to 30 mm, or 30 mm to 35 mm. In one example, the width Wm is 24 mm. Optionally, the radius r is in a range of 5 mm to 20 mm, e.g., 5 mm to 10 mm, 10 mm to 15 mm, or 15 mm to 20 mm. In one example, the radius r is 12 mm.

In some embodiments, the elongated branch lines of the first branch structure BT1 has a width of 0.1 mm to 1.6 mm, e.g., 0.1 mm to 0.2 mm, 0.2 mm to 0.4 mm, 0.4 mm to 0.6 mm, 0.6 mm to 0.8 mm, 0.8 mm to 1.0 mm, 1.0 mm to 1.2 mm, 1.2 mm to 1.4 mm, or 1.4 mm to 1.6 mm. In some example, the elongated branch lines of the first branch structure BT1 has a width of 0.5 mm.

Optionally, the first branch B1 has a length L1 of 1.5 mm to 5.5 mm, e.g., 1.5 mm to 2.0 mm, 2.0 mm to 2.5 mm, 2.5 mm to 3.0 mm, 3.0 mm to 3.5 mm, 3.5 mm to 4.0 mm, 4.0 mm to 4.5 mm, 4.5 mm to 5.0 mm, or 5.0 mm to 5.5 mm. In one example, the first branch B1 has a length L1 of 3.5 mm. Optionally, the second branch B2 has a length L2 of 10 mm to 40 mm, e.g., 10 mm to 15 mm, 15 mm to 20 mm, 20 mm to 25 mm, 25 mm to 30 mm, 30 mm to 35 mm, or 35 mm to 40 mm. In one example, the second branch B2 has a length L2 of 24.5 mm.

In some embodiments, a ratio of the length L1 to the length L2 is in a range of 1:3 to 1:15, e.g., 1:3 to 1:4, 1:4 to 1:5, 1:5 to 1:6, 1:6 to 1:7, 1:7 to 1:8, 1:8 to 1:9, 1:9 to 1:10, 1:10 to 1:11, 1:11 to 1:12, 1:12 to 1:13, 1:13 to 1:14, or 1:14 to 1:15. In one example, the ratio of the length L1 to the length L2 is 3.5:24.5.

In some embodiments, the microstrip feed line FL has a length Lf and a width Wf. Optionally, the length Lf is in a range of 5 mm to 15 mm, e.g., 5 mm to 10 mm or 10 mm to 15 mm. Optionally, the width Wf is in a range of 0.5 mm to 5 mm, e.g., 0.5 mm to 1.5 mm, 1.5 mm to 2.5 mm, 2.5 mm to 3.5 mm, 3.5 mm to 4.5 mm, or 4.5 mm to 5.5 mm. In one example, the length Lf is 10 mm, and the width Wf is 1.9 mm.

In some embodiments, the impedance transformation structure TS has a trapezoidal shape having a longer side having a width substantially the same as the length Lm, and a shorter side having a width substantially the same as the width Wf. Optionally, the longer side has a width in a range of 25 mm to 45 mm, e.g., 25 mm to 30 mm, 30 mm to 35 mm, 35 mm to 40 mm, or 40 mm to 45 mm. In one example, the longer side has a width of 36 mm. Optionally, the shorter side has a width in a range of 0.5 mm to 5 mm, e.g., 0.5 mm to 1.5 mm, 1.5 mm to 2.5 mm, 2.5 mm to 3.5 mm, 3.5 mm to 4.5 mm, or 4.5 mm to 5.5 mm. In one example, the shorter side has a width of 1.9 mm.

In some embodiments, referring to FIG. 1B, the ground plate GP has a length Lg and a width Wg. Optionally, a ratio of the width Wg to the length Lg is in a range of 1:2 to 1:10, e.g., 1:2 to 1:3, 1:3 to 1:4, 1:4 to 1:5, 1:5 to 1:6, 1:6 to 1:7, 1:7 to 1:8, 1:8 to 1:9, or 1:9 to 1:10. In one example, the ratio of the width Wg to the length Lg is 10:48. In another example, the length Lg is 48 mm and the width Wg is 10 mm.

In one example, the dielectric layer DL has a length of 48 mm and a width of 48 mm. In another example, the dielectric layer DL has dk/df value of 4.4/0.02.

Figure 3A:
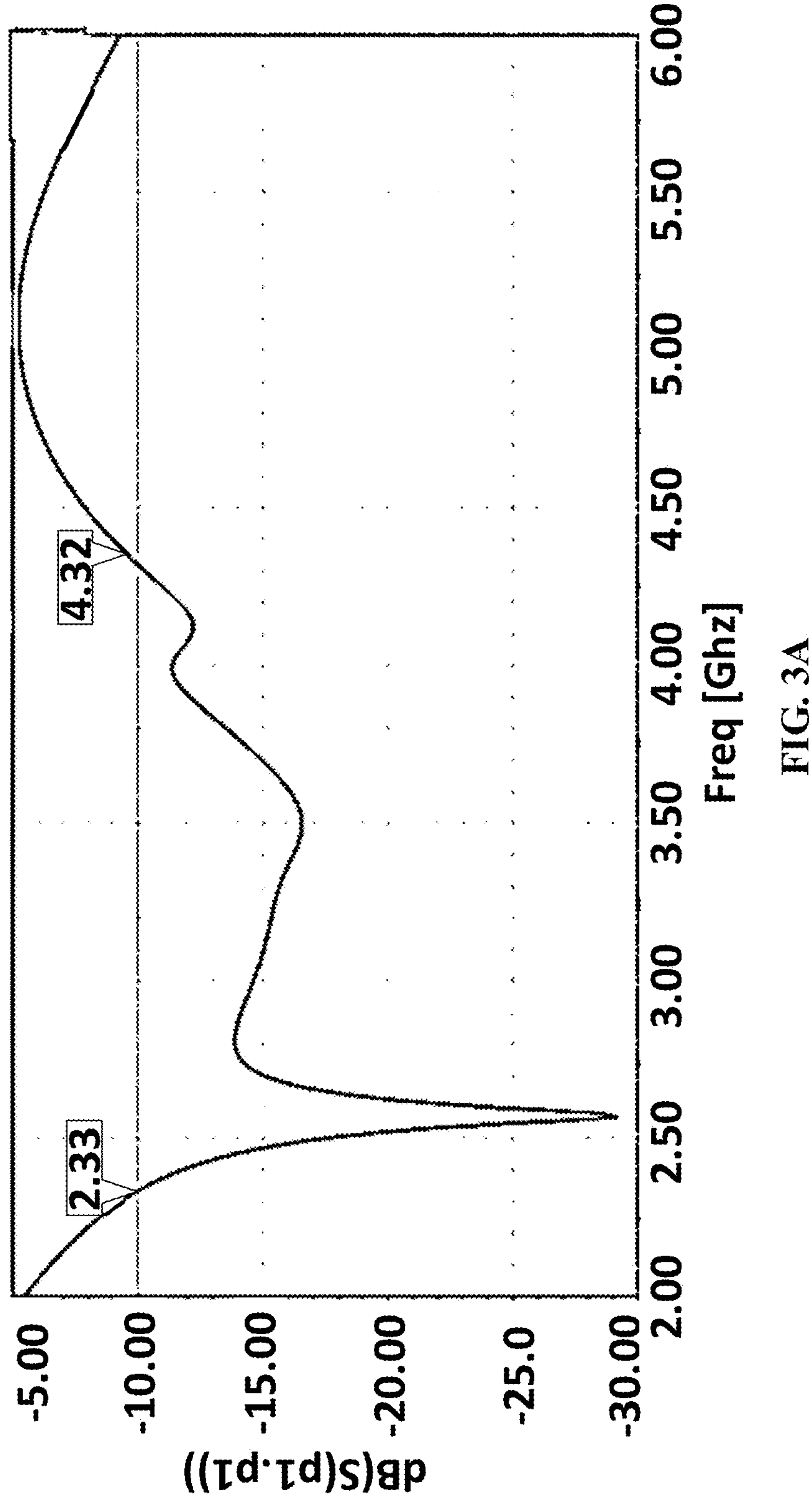
FIG. 3A illustrates an S11 graph of the antenna depicted in FIG. 1A.
Figure 3B:
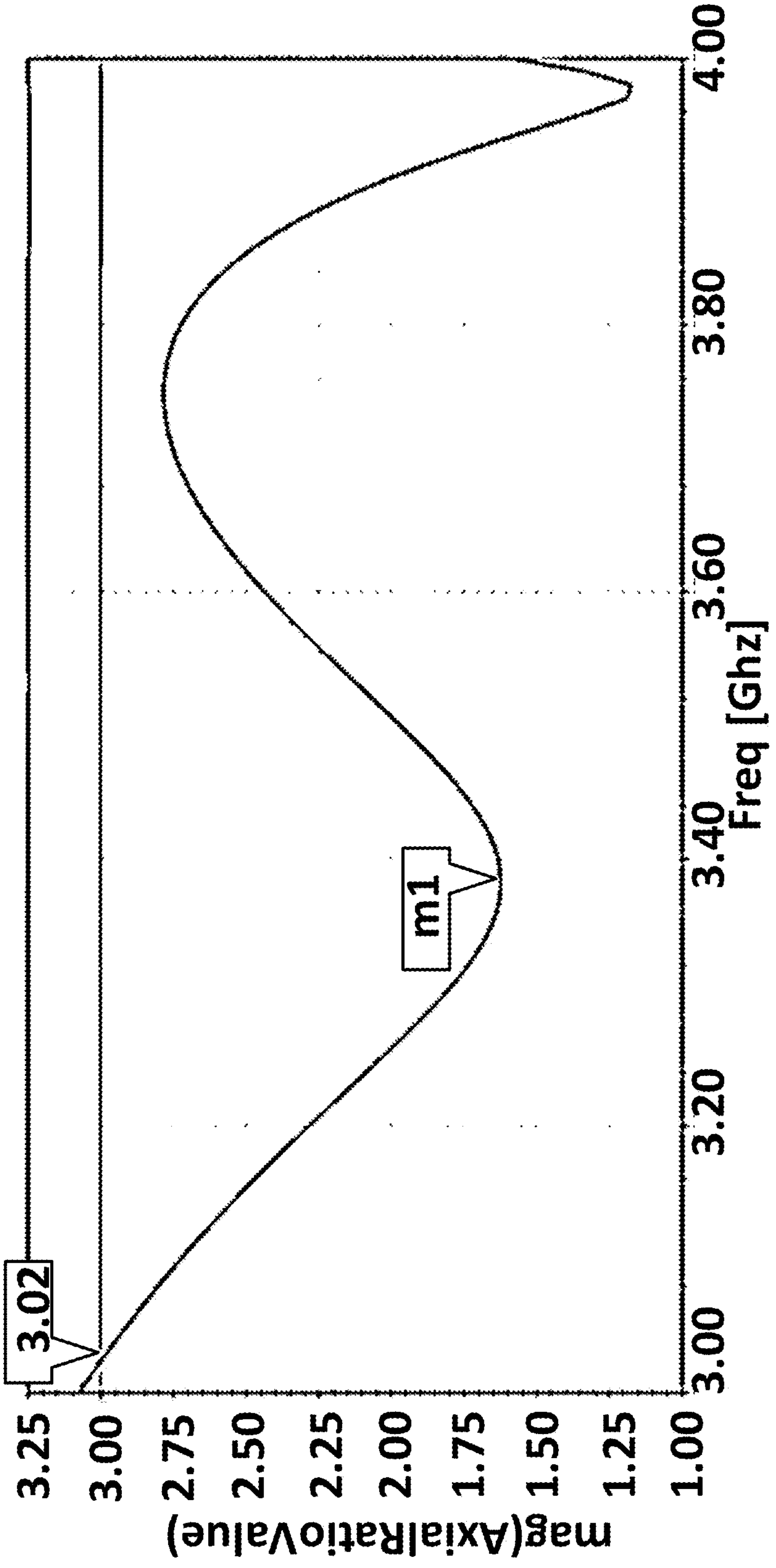
FIG. 3B illustrates an axial ratio graph of the antenna depicted in FIG. 1A.
Figure 3C:
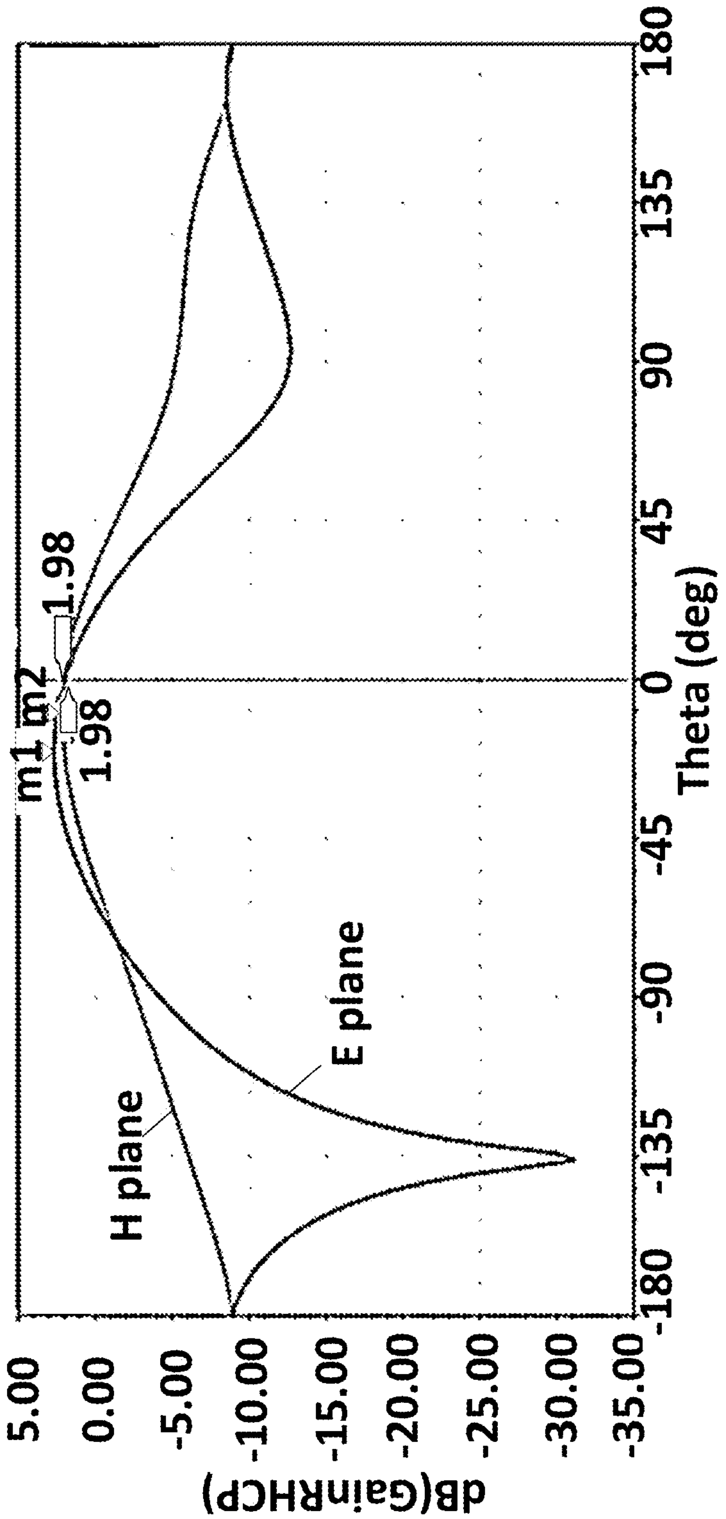
FIG. 3C illustrates a right-handed polarization gain curve of the E plane and the H plane at 3.38 GHz obtained in the antenna depicted in FIG. 1A.

In one specific example, the antenna has an overall thickness of $0.014\lambda_0$, wherein $\lambda_0$ stands for a wavelength in vacuum of a radiation produced by the antenna. FIG. 3A illustrates an S11 graph of the antenna depicted in FIG. 1A. Referring to FIG. 3A, the antenna has a −10 dB impedance bandwidth ranging from 2.33 GHZ to 4.32 GHz. FIG. 3B illustrates an axial ratio graph of the antenna depicted in FIG. 1A. Referring to FIG. 3B, the axial ratio band width at 3 dB ranges from 3.3 GHZ to 3.8 GHZ, covering an entire n78 band. The minimum value of the axial ratio and the corresponding frequency point in the n78 band are 1.6 dB and 3.38 GHZ, respectively. FIG. 3C illustrates a right-handed polarization gain curve of the E plane and the H plane at 3.38 GHz obtained in the antenna depicted in FIG. 1A. The E plane refers to, for example, a plane orthogonal to the dielectric layer DL in FIG. 1A, or the plane extending along a placement direction of the microstrip feed line FL. The H plane refers to a plane orthogonal to the dielectric layer DL and orthogonal to the E plane. Referring to FIG. 3C, the peak values of right-handed polarization gains of the E plane and the H plane are both greater than 2 dBi (2.12 dBi and 2.67 dBi, respectively). Due to the asymmetrical structure of the radiating patch in the present antenna, the right-handed polarization gain curve of the E plane is asymmetrical, and the peak value of the right-handed polarization gain of the E plane does not correspond to theta of zero degree. However, the right-handed polarization gain of the E plane at theta of zero degree is 2 dBi, whereas the peak value of the right-handed polarization gain of the E plane is 2.67 dBi, greater than 2 dBi by at least 0.6 dBi. The present antenna achieves a complete right circular polarization at n78 band.

Figure 5A:
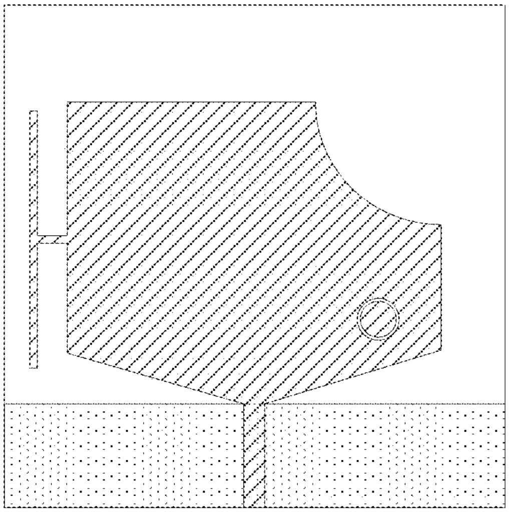
FIG. 5A is a plan view of an antenna in some embodiments according to the present disclosure.
Figure 5B:
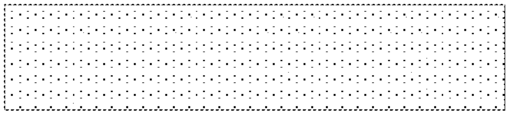
FIG. 5B illustrates the structure of a ground plate in an antenna depicted in FIG. 5A.
Figure 5C:
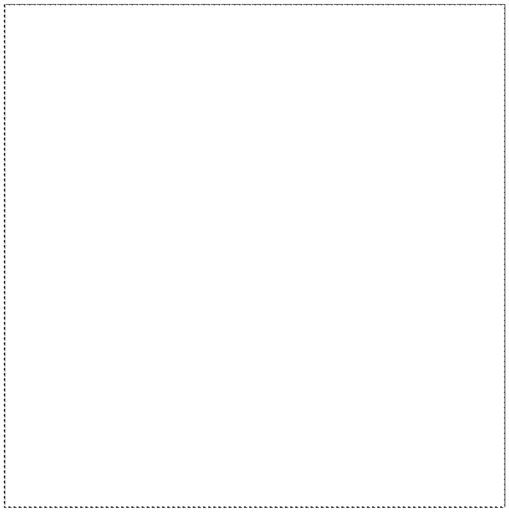
FIG. 5C illustrates the structure of a dielectric layer in an antenna depicted in FIG. 5A.
Figure 5D:
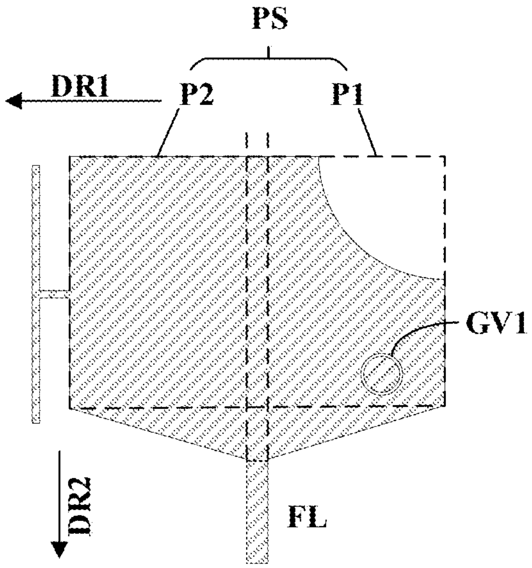
FIG. 5D illustrates the structure of a radiating patch, a microstrip feed line, and an impedance transformation structure in an antenna depicted in FIG. 5A.

FIG. 5A is a plan view of an antenna in some embodiments according to the present disclosure. FIG. 5B illustrates the structure of a ground plate in an antenna depicted in FIG. 5A. FIG. 5C illustrates the structure of a dielectric layer in an antenna depicted in FIG. 5A. FIG. 5D illustrates the structure of a radiating patch, a microstrip feed line, and an impedance transformation structure in an antenna depicted in FIG. 5A. Referring to FIG. 5A to FIG. 5D, the antenna in some embodiments further includes a first ring-shaped groove GV1 extending through the main body MB. As shown in FIG. 5D, a virtual extension of the microstrip feed line FL partitions the parallelogram shape PS into two portions including a first portion P1 and a second portion P2. The first ring-shaped groove GV1 extends through a portion (the first portion P1) of the parallelogram shape PS that is truncated by the first notch. In one example, the first ring-shaped groove GV1 has an inside diameter of 3.2 mm and an outside diameter of 4.0 mm. In another example, along the first longitudinal direction DR1, the first ring-shaped groove GV1 is spaced apart from an edge of the unitary structure comprising the radiating plate RP and the impedance transformation structure TS by a distance of 6 mm. In another example, along the second longitudinal direction DR2, the first ring-shaped groove GV1 is spaced apart from the edge of the unitary structure comprising the radiating plate RP and the impedance transformation structure TS by a distance of 3 mm.

Figure 6A:
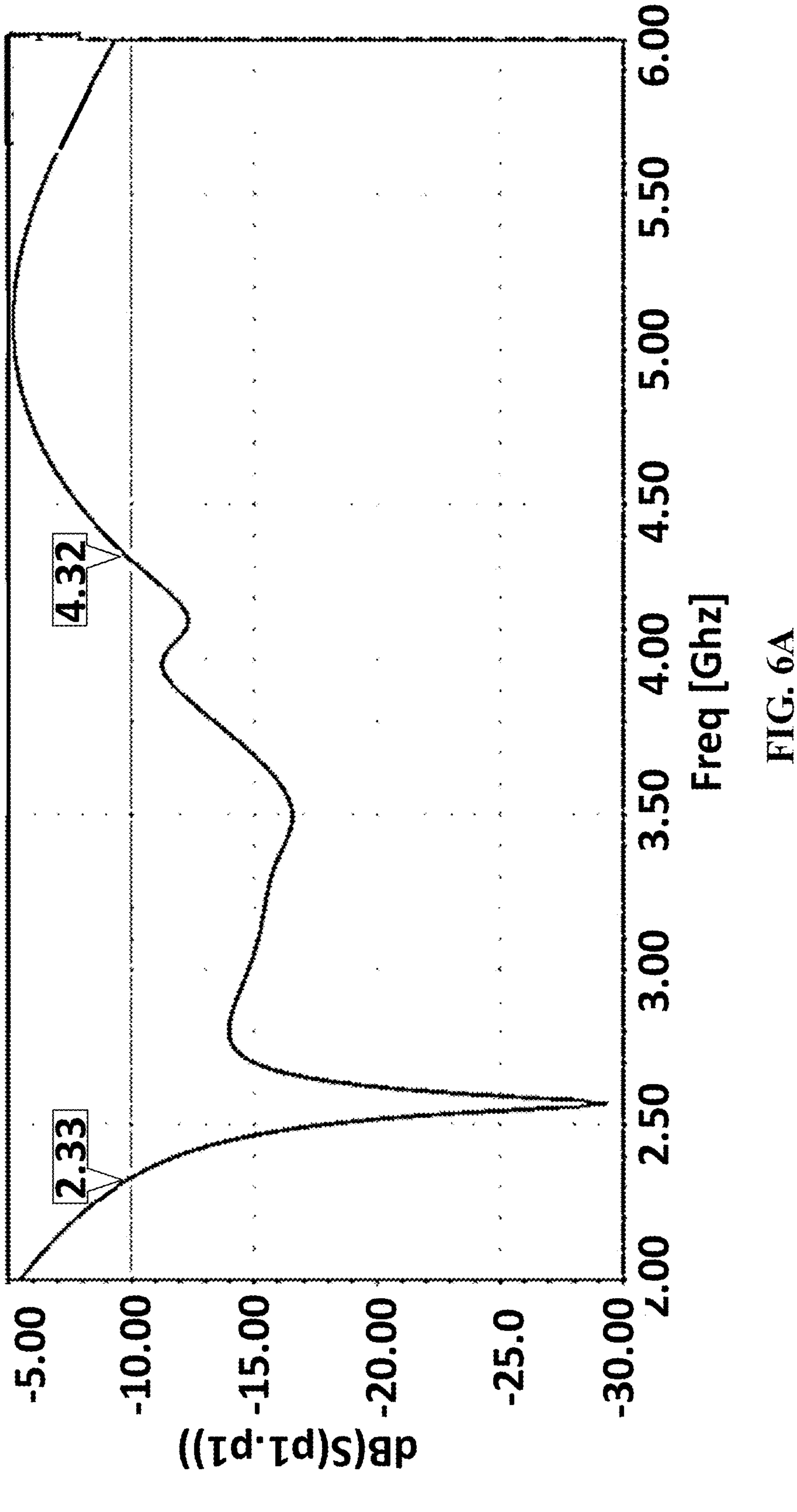
FIG. 6A illustrates an S11 graph of the antenna depicted in FIG. 5A.
Figure 6B:
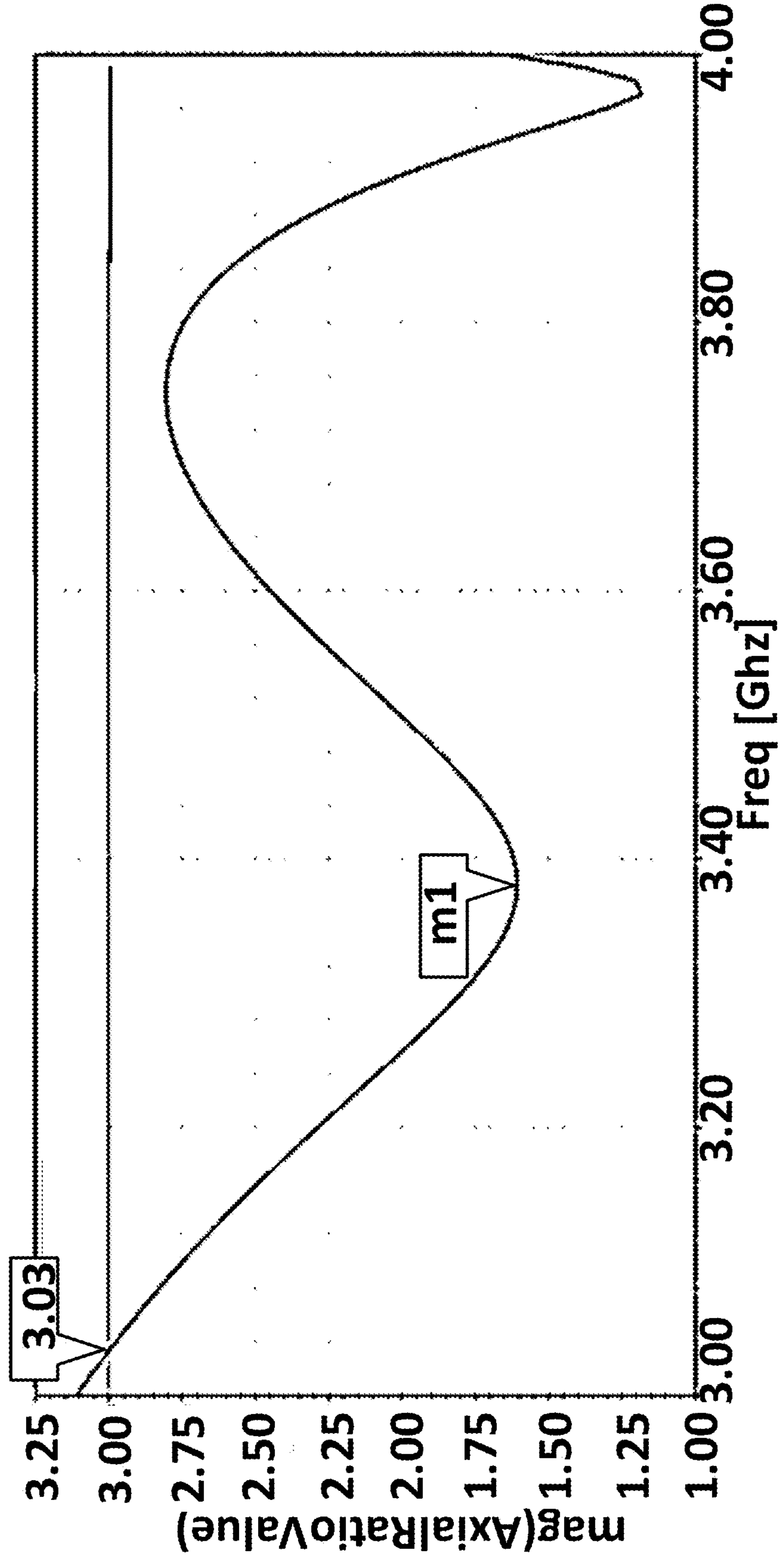
FIG. 6B illustrates an axial ratio graph of the antenna depicted in FIG. 5A.
Figure 6C:
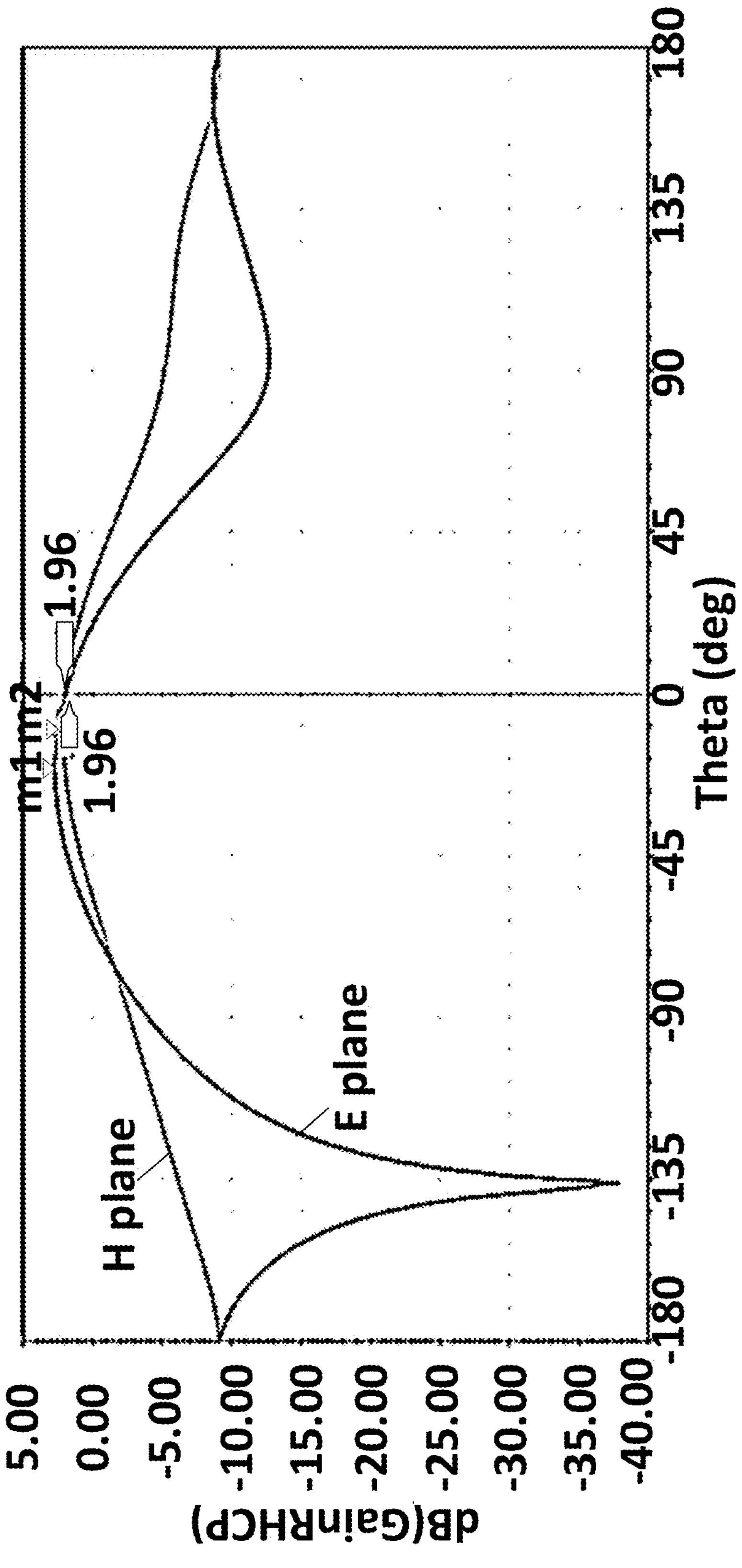
FIG. 6C illustrates a right-handed polarization gain curve of the E plane and the H plane at 3.38 GHz obtained in the antenna depicted in FIG. 5A.

In one specific example, the antenna has an overall thickness of $0.014\lambda_0$, wherein $\lambda_0$ stands for a wavelength in vacuum of a radiation produced by the antenna. FIG. 6A illustrates an S11 graph of the antenna depicted in FIG. 5A. Referring to FIG. 6A, the antenna has a −10 dB impedance bandwidth ranging from 2.33 GHZ to 4.32 GHZ. FIG. 6B illustrates an axial ratio graph of the antenna depicted in FIG. 5A. Referring to FIG. 6B, the axial ratio band width at 3 dB ranges from 3.3 GHZ to 3.8 GHZ, covering an entire n78 band. The minimum value of the axial ratio and the corresponding frequency point in the n78 band are 1.6 dB and 3.38 GHz, respectively. FIG. 6C illustrates a right-handed polarization gain curve of the E plane and the H plane at 3.38 GHz obtained in the antenna depicted in FIG. 5A. Referring to FIG. 6C, the peak values of right-handed polarization gains of the E plane and the H plane are both greater than 2 dBi (2.10 dBi and 2.68 dBi, respectively). Due to the asymmetrical structure of the radiating patch in the present antenna, the right-handed polarization gain curve of the E plane is asymmetrical, and the peak value of the right-handed polarization gain of the E plane does not correspond to theta of zero degree. However, the right-handed polarization gain of the E plane at theta of zero degree is 1.96 dBi, whereas the peak value of the right-handed polarization gain of the E plane is 2.68 dBi, greater than 1.96 dBi by at least 0.61 dBi. The present antenna achieves a complete right circular polarization at n78 band.

The inventors of the present disclosure discover that the performance of the antenna depicted in FIG. 5A is similar to the antenna depicted in FIG. 1A, particularly when the first ring-shaped groove GV1 is spaced apart from an edge of the unitary structure comprising the radiating plate RP and the impedance transformation structure TS by a distance in a range of 1 mm to 7 mm, e.g., 1 mm to 2 mm, 2 mm to 3 mm, 3 mm to 4 mm, 4 mm to 5 mm, 5 mm to 6 mm, or 6 mm to 7 mm.

Figure 7A:
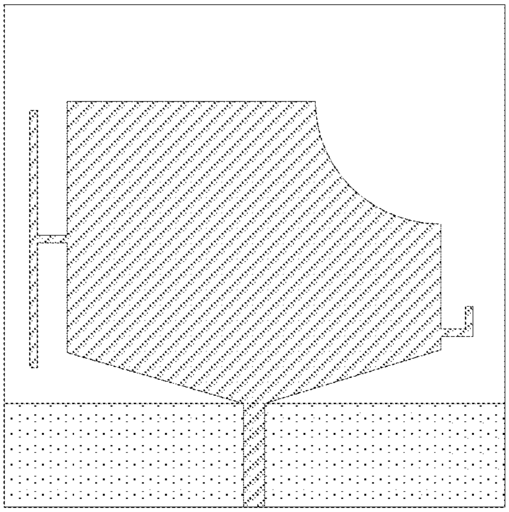
FIG. 7A is a plan view of an antenna in some embodiments according to the present disclosure.
Figure 7B:
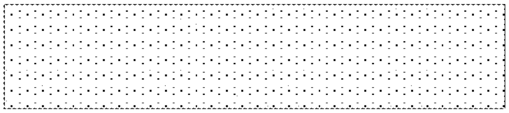
FIG. 7B illustrates the structure of a ground plate in an antenna depicted in FIG. 7A.
Figure 7C:
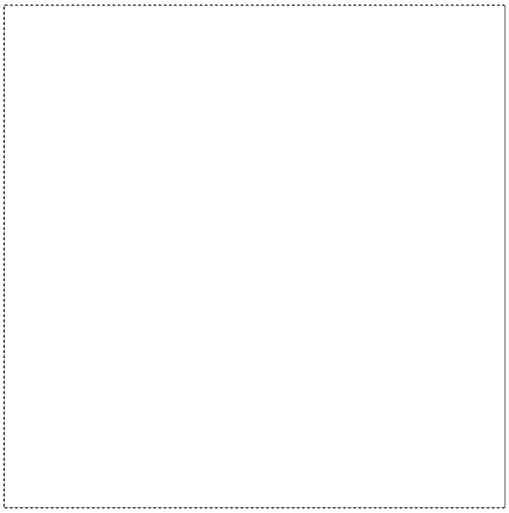
FIG. 7C illustrates the structure of a dielectric layer in an antenna depicted in FIG. 7A.
Figure 7D:
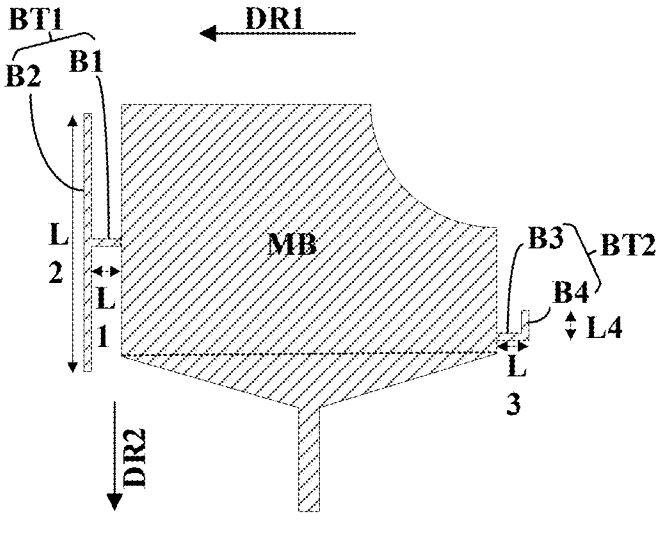
FIG. 7D illustrates the structure of a radiating patch, a microstrip feed line, and an impedance transformation structure in an antenna depicted in FIG. 7A.

FIG. 7A is a plan view of an antenna in some embodiments according to the present disclosure. FIG. 7B illustrates the structure of a ground plate in an antenna depicted in FIG. 7A. FIG. 7C illustrates the structure of a dielectric layer in an antenna depicted in FIG. 7A. FIG. 7D illustrates the structure of a radiating patch, a microstrip feed line, and an impedance transformation structure in an antenna depicted in FIG. 7A. Referring to FIG. 7A to FIG. 7D, the antenna in some embodiments further includes a second branch structure BT2. Optionally, the first branch structure BT1 and the second branch structure BT2 are connected to two opposite sides of the main body MB. Optionally, the first branch structure BT1 has a T shape, and the second branch structure BT2 has a L shape.

Referring to FIG. 7D, the first branch structure BT1 in some embodiments includes a first branch B1 connected to the main body MB and a second branch B2 connected to the first branch B1. The second branch structure BT2 in some embodiments includes a third branch B3 connected to the main body MB and a fourth branch B4 connected to the third branch B3. Optionally, the first branch B1 and the third branch B3 are elongated in a first longitudinal direction DR1; and the second branch B2 and the fourth branch B4 are elongated in a second longitudinal direction DR2 different from the first longitudinal direction DR1. Optionally, the first longitudinal direction DR1 is perpendicular to the second longitudinal direction DR2.

In some embodiments, the elongated branch lines of the first branch structure BT1 or the second branch structure BT2 has a width of 0.1 mm to 1.6 mm, e.g., 0.1 mm to 0.2 mm, 0.2 mm to 0.4 mm, 0.4 mm to 0.6 mm, 0.6 mm to 0.8 mm, 0.8 mm to 1.0 mm, 1.0 mm to 1.2 mm, 1.2 mm to 1.4 mm, or 1.4 mm to 1.6 mm. In some example, the elongated branch lines of the first branch structure BT1 or the second branch structure BT2 has a width of 0.5 mm.

Optionally, the first branch B1 has a length L1 of 1.5 mm to 5.5 mm, e.g., 1.5 mm to 2.0 mm, 2.0 mm to 2.5 mm, 2.5 mm to 3.0 mm, 3.0 mm to 3.5 mm, 3.5 mm to 4.0 mm, 4.0 mm to 4.5 mm, 4.5 mm to 5.0 mm, or 5.0 mm to 5.5 mm. In one example, the first branch B1 has a length L1 of 3.5 mm. Optionally, the second branch B2 has a length L2 of 10 mm to 40 mm, e.g., 10 mm to 15 mm, 15 mm to 20 mm, 20 mm to 25 mm, 25 mm to 30 mm, 30 mm to 35 mm, or 35 mm to 40 mm. In one example, the second branch B2 has a length L2 of 24.5 mm.

Optionally, the third branch B3 has a length L3 of 1.0 mm to 5.0 mm, e.g., 1.0 mm to 1.5 mm, 1.5 mm to 2.0 mm, 2.0 mm to 2.5 mm, 2.5 mm to 3.0 mm, 3.0 mm to 3.5 mm, 3.5 mm to 4.0 mm, 4.0 mm to 4.5 mm, or 4.5 mm to 5.0 mm. In one example, the third branch B3 has a length L3 of 3.0 mm. Optionally, the fourth branch B4 has a length L4 of 0.5 mm to 4.5 mm, e.g., 0.5 mm to 1.0 mm, 1.0 mm to 1.5 mm, 1.5 mm to 2.0 mm, 2.0 mm to 2.5 mm, 2.5 mm to 3.0 mm, 3.0 mm to 3.5 mm, 3.5 mm to 4.0 mm, or 4.0 mm to 4.5 mm. In one example, the fourth branch B4 has a length L4 of 2.5 mm.

In some embodiments, a ratio of the length L1 to the length L2 is in a range of 1:3 to 1:15, e.g., 1:3 to 1:4, 1:4 to 1:5, 1:5 to 1:6, 1:6 to 1:7, 1:7 to 1:8, 1:8 to 1:9, 1:9 to 1:10, 1:10 to 1:11, 1:11 to 1:12, 1:12 to 1:13, 1:13 to 1:14, or 1:14 to 1:15. In one example, the ratio of the length L1 to the length L2 is 3.5:24.5. In some embodiments, a ratio of the length L3 to the length L4 is in a range of 3:0.5 to 3:12.5, e.g., 3:0.5 to 3:1.5, 3:1.5 to 3:2.5, 3:2.5 to 3:3.5, 3:3.5 to 3:4.5, 3:4.5 to 3:5.5, 3:5.5 to 3:6.5, 3:6.5 to 3:7.5, 3:7.5 to 3:8.5, 3:8.5 to 3:9.5, 3:9.5 to 3:10.5, 3:10.5 to 3:11.5, or 3:11.5 to 3:12.5. In one example, the ratio of the length L3 to the length L4 is 3:2.5.

In some embodiments, a ratio of the length L4 to the length L2 is in a range of 1:5 to 1:15, e.g., 1:5 to 1:6, 1:6 to 1:7, 1:7 to 1:8, 1:8 to 1:9, 1:9 to 1:10, 1:10 to 1:11, 1:11 to 1:12, 1:12 to 1:13, 1:13 to 1:14, or 1:14 to 1:15. In one example, the ratio of the length L4 to the length L2 is 2.5:24.5.

Figure 8A:
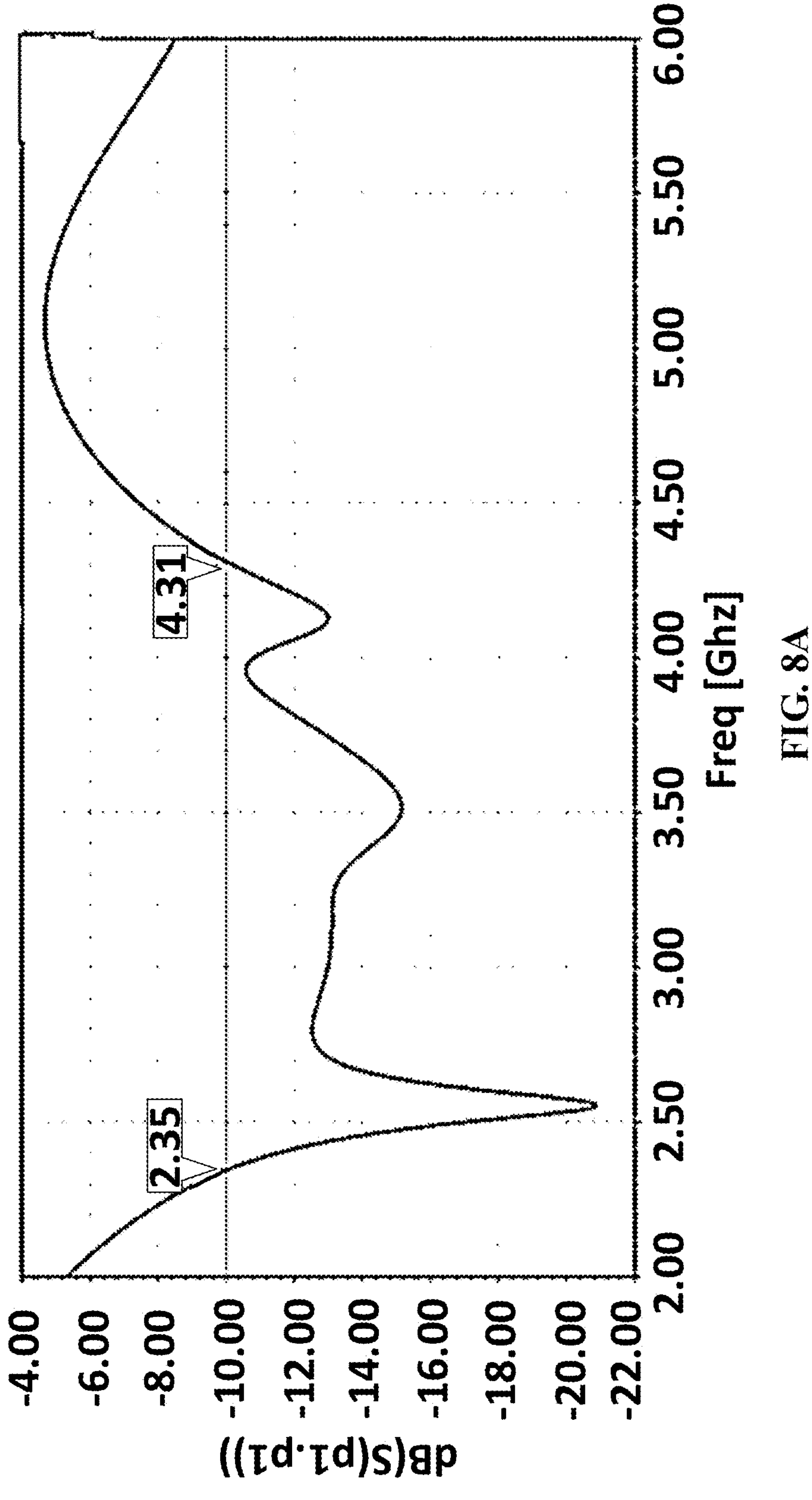
FIG. 8A illustrates an S11 graph of the antenna depicted in FIG. 7A.
Figure 8B:
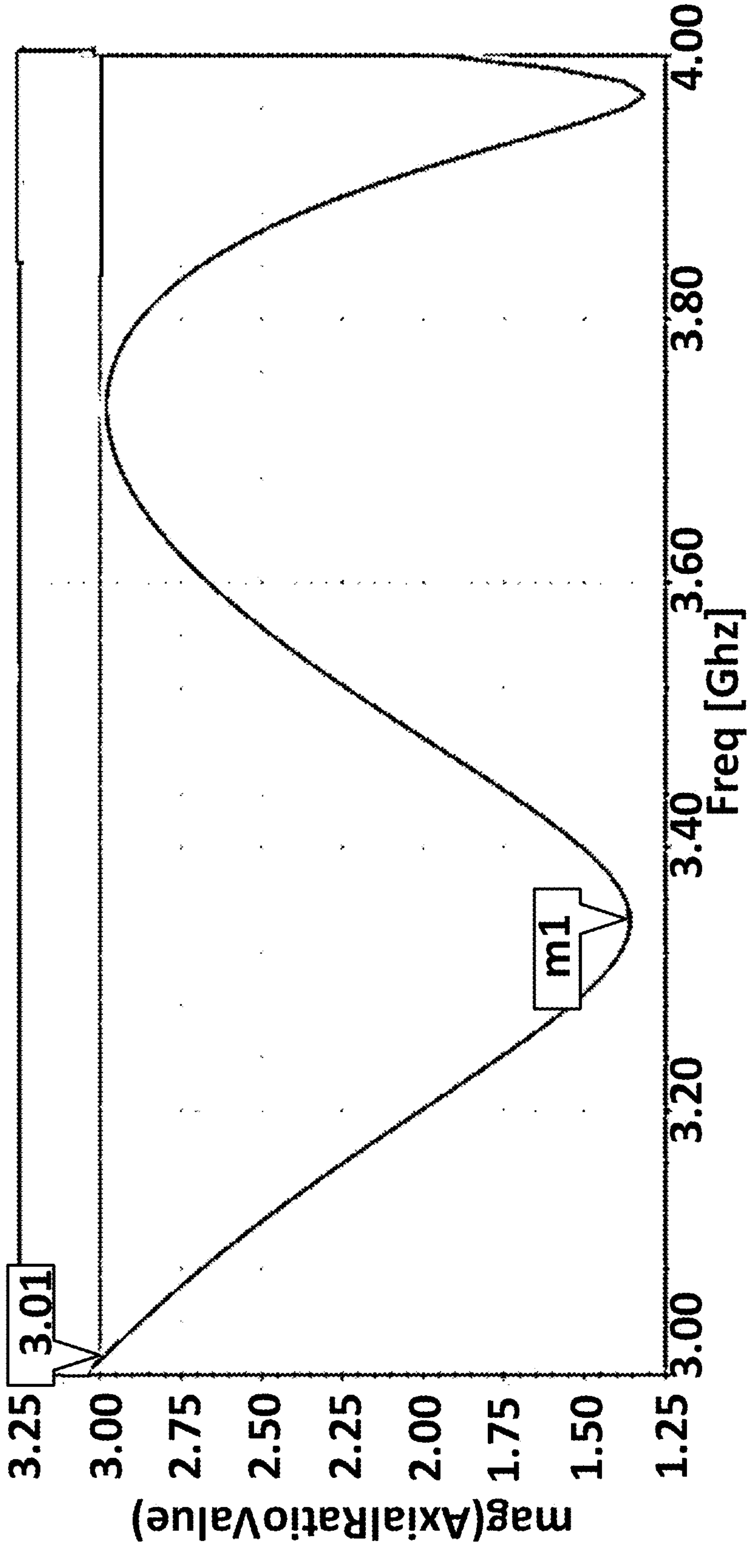
FIG. 8B illustrates an axial ratio graph of the antenna depicted in FIG. 7A.
Figure 8C:
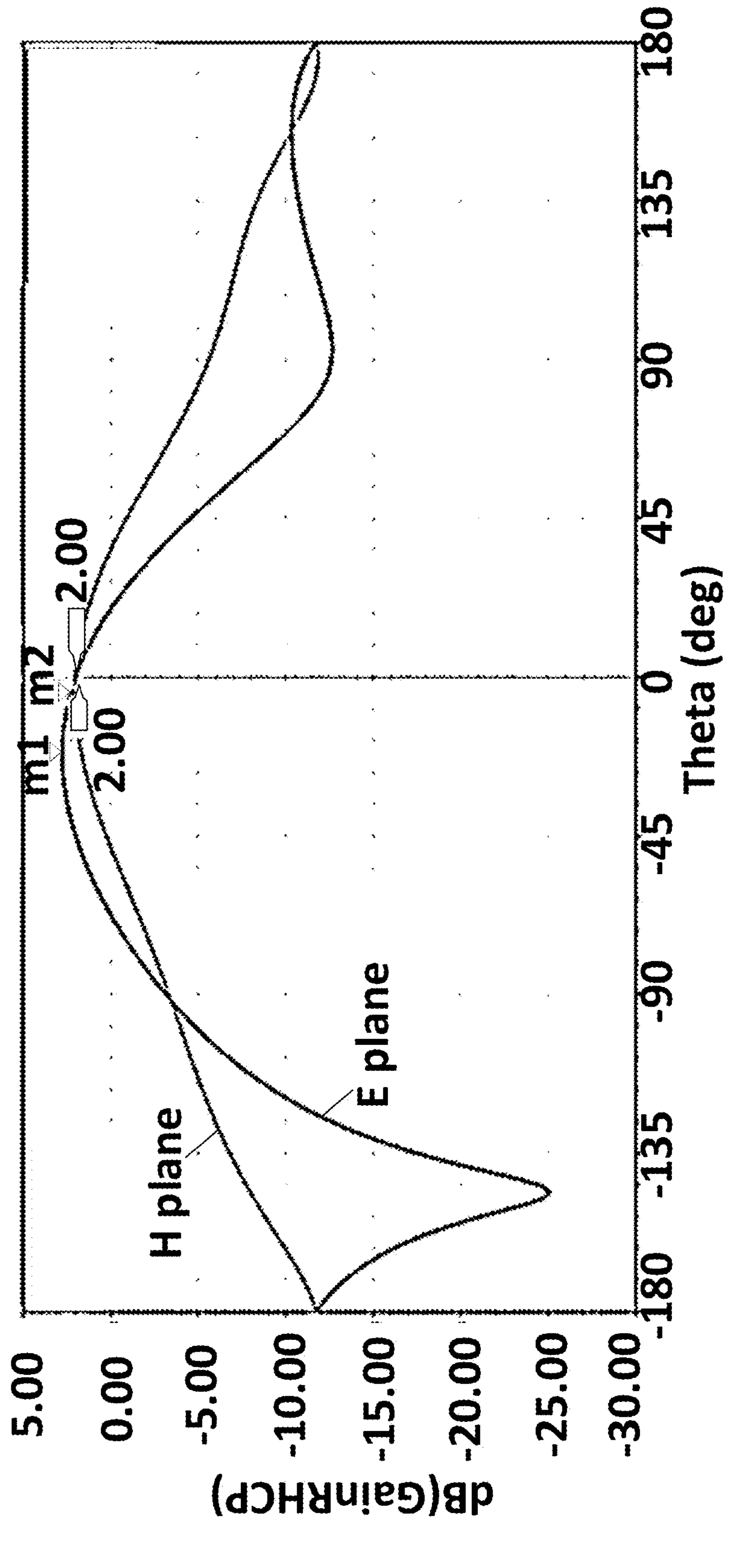
FIG. 8C illustrates a right-handed polarization gain curve of the E plane and the H plane at 3.35 GHz obtained in the antenna depicted in FIG. 7A.

In one specific example, the antenna has an overall thickness of $0.014\lambda_0$, wherein $\lambda_0$ stands for a wavelength in vacuum of a radiation produced by the antenna. FIG. 8A illustrates an S11 graph of the antenna depicted in FIG. 7A. Referring to FIG. 8A, the antenna has a −10 dB impedance bandwidth ranging from 2.35 GHz to 4.31 GHz. FIG. 8B illustrates an axial ratio graph of the antenna depicted in FIG. 7A. Referring to FIG. 8B, the axial ratio band width at 3 dB ranges from 3.3 GHZ to 3.8 GHZ, covering an entire n78 band. The minimum value of the axial ratio and the corresponding frequency point in the n78 band are 1.4 dB and 3.35 GHZ, respectively. FIG. 8C illustrates a right-handed polarization gain curve of the E plane and the H plane at 3.35 GHz obtained in the antenna depicted in FIG. 7A. Referring to FIG. 8C, the peak values of right-handed polarization gains of the E plane and the H plane are both greater than 2 dBi (2.02 dBi and 2.76 dBi, respectively). Due to the asymmetrical structure of the radiating patch in the present antenna, the right-handed polarization gain curve of the E plane is asymmetrical, and the peak value of the right-handed polarization gain of the E plane does not correspond to theta of zero degree. However, the right-handed polarization gain of the E plane at theta of zero degree is 2.0 dBi, whereas the peak value of the right-handed polarization gain of the E plane is 2.76 dBi, greater than 2 dBi by at least 0.76 dBi. The present antenna achieves a complete right circular polarization at n78 band.

The inventors of the present disclosure discover that the performance of the antenna depicted in FIG. 7A is similar to the antenna depicted in FIG. 1A, particularly when the length L4 is in a range of 1 mm to 3 mm, e.g., 1 mm to 2 mm or 2 mm to 3 mm.

Figure 9A:
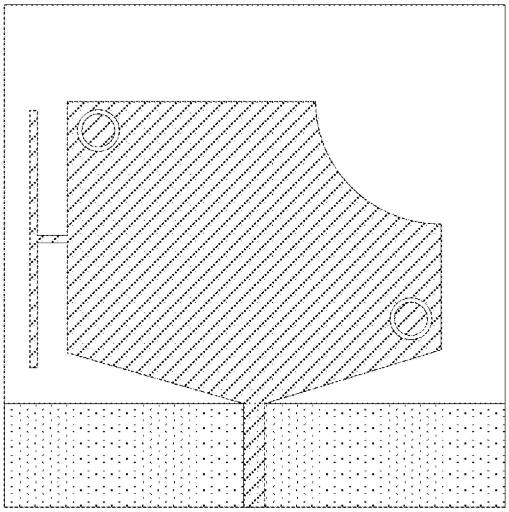
FIG. 9A is a plan view of an antenna in some embodiments according to the present disclosure.
Figure 9B:
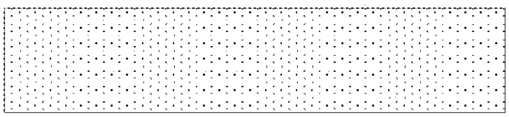
FIG. 9B illustrates the structure of a ground plate in an antenna depicted in FIG. 9A.
Figure 9C:
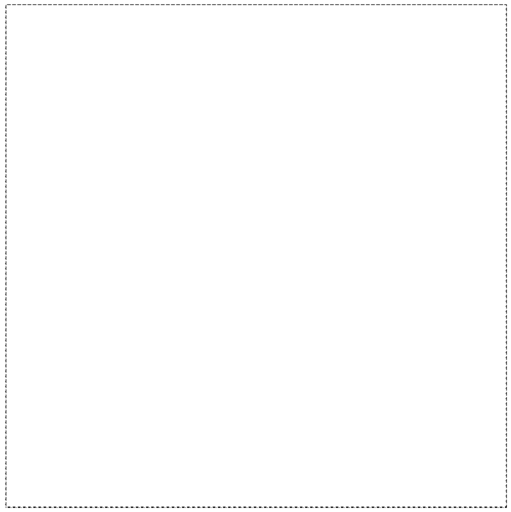
FIG. 9C illustrates the structure of a dielectric layer in an antenna depicted in FIG. 9A.
Figure 9D:
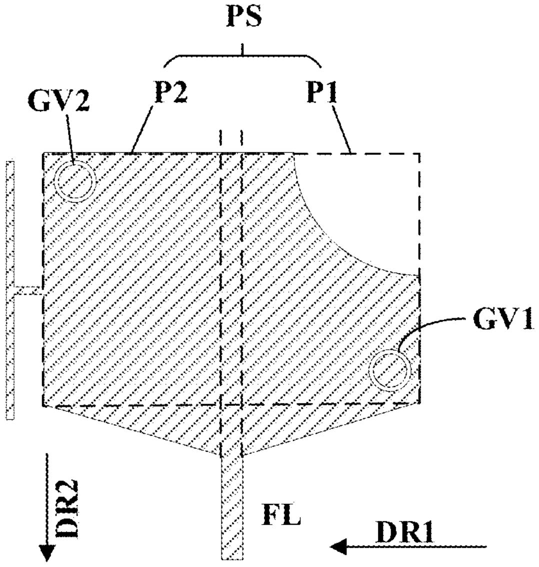
FIG. 9D illustrates the structure of a radiating patch, a microstrip feed line, and an impedance transformation structure in an antenna depicted in FIG. 9A.

FIG. 9A is a plan view of an antenna in some embodiments according to the present disclosure. FIG. 9B illustrates the structure of a ground plate in an antenna depicted in FIG. 9A. FIG. 9C illustrates the structure of a dielectric layer in an antenna depicted in FIG. 9A. FIG. 9D illustrates the structure of a radiating patch, a microstrip feed line, and an impedance transformation structure in an antenna depicted in FIG. 9A. Referring to FIG. 9A to FIG. 9D, the antenna in some embodiments further includes a second ring-shaped groove GV2 extending through the main body MB. As shown in FIG. 9D, a virtual extension of the microstrip feed line FL partitions the parallelogram shape PS into two portions including a first portion P1 and a second portion P2. The first ring-shaped groove GV1 extends through a portion (the first portion P1) of the parallelogram shape PS that is truncated by the first notch. The second ring-shaped groove GV2 extends through a portion (the second portion P2) of the parallelogram shape PS, the second portion P2 different from the first portion P1. Optionally, the second portion P2 is a portion that is not truncated by the first notch. In one example, the first ring-shaped groove GV1 has an inside diameter of 3.2 mm and an outside diameter of 4.0 mm. In another example, the second ring-shaped groove GV2 has an inside diameter of 3.2 mm and an outside diameter of 4.0 mm. In another example, along the first longitudinal direction DR1, the first ring-shaped groove GV1 is spaced apart from an edge of the unitary structure comprising the radiating plate RP and the impedance transformation structure TS by a distance of 3 mm. In another example, along the second longitudinal direction DR2, the first ring-shaped groove GV1 is spaced apart from the edge of the unitary structure comprising the radiating plate RP and the impedance transformation structure TS by a distance of 3 mm. In another example, along the first longitudinal direction DR1, the second ring-shaped groove GV2 is spaced apart from the edge of the unitary structure comprising the radiating plate RP and the impedance transformation structure TS by a distance of 3 mm. In another example, along the second longitudinal direction DR2, the second ring-shaped groove GV2 is spaced apart from the edge of the unitary structure comprising the radiating plate RP and the impedance transformation structure TS by a distance of 3 mm.

Figure 10A:
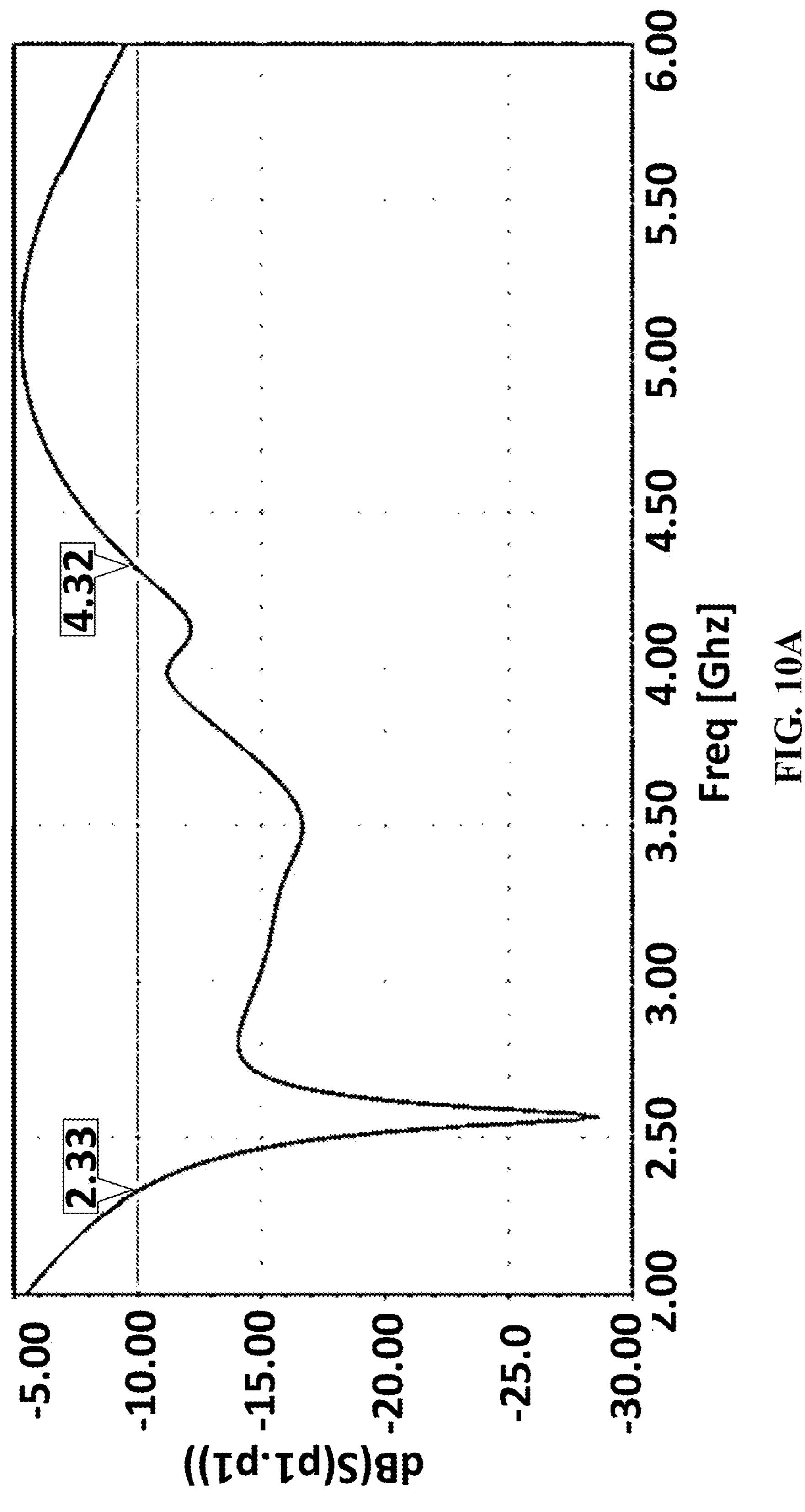
FIG. 10A illustrates an S11 graph of the antenna depicted in FIG. 9A.
Figure 10B:
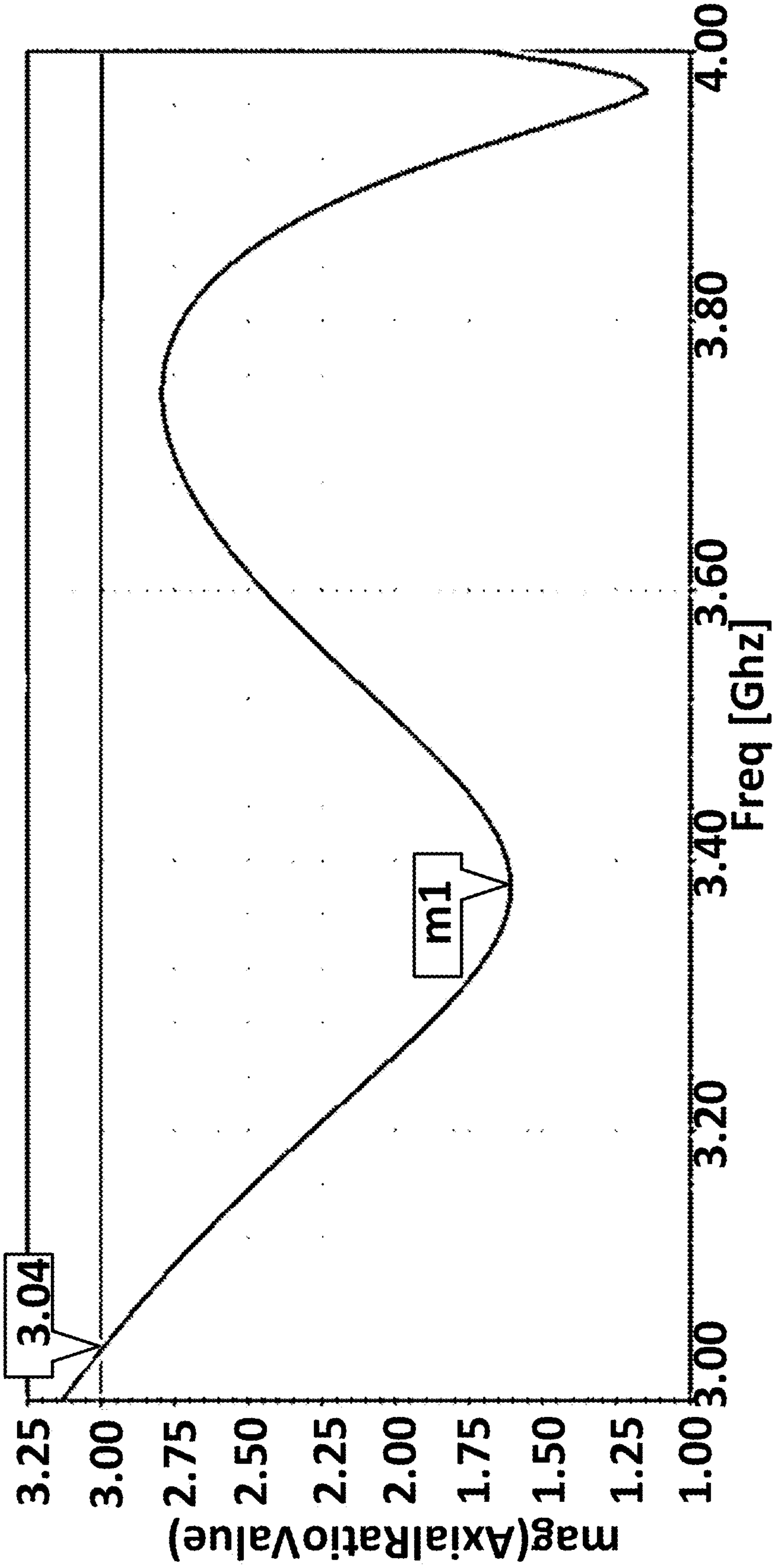
FIG. 10B illustrates an axial ratio graph of the antenna depicted in FIG. 9A.
Figure 10C:
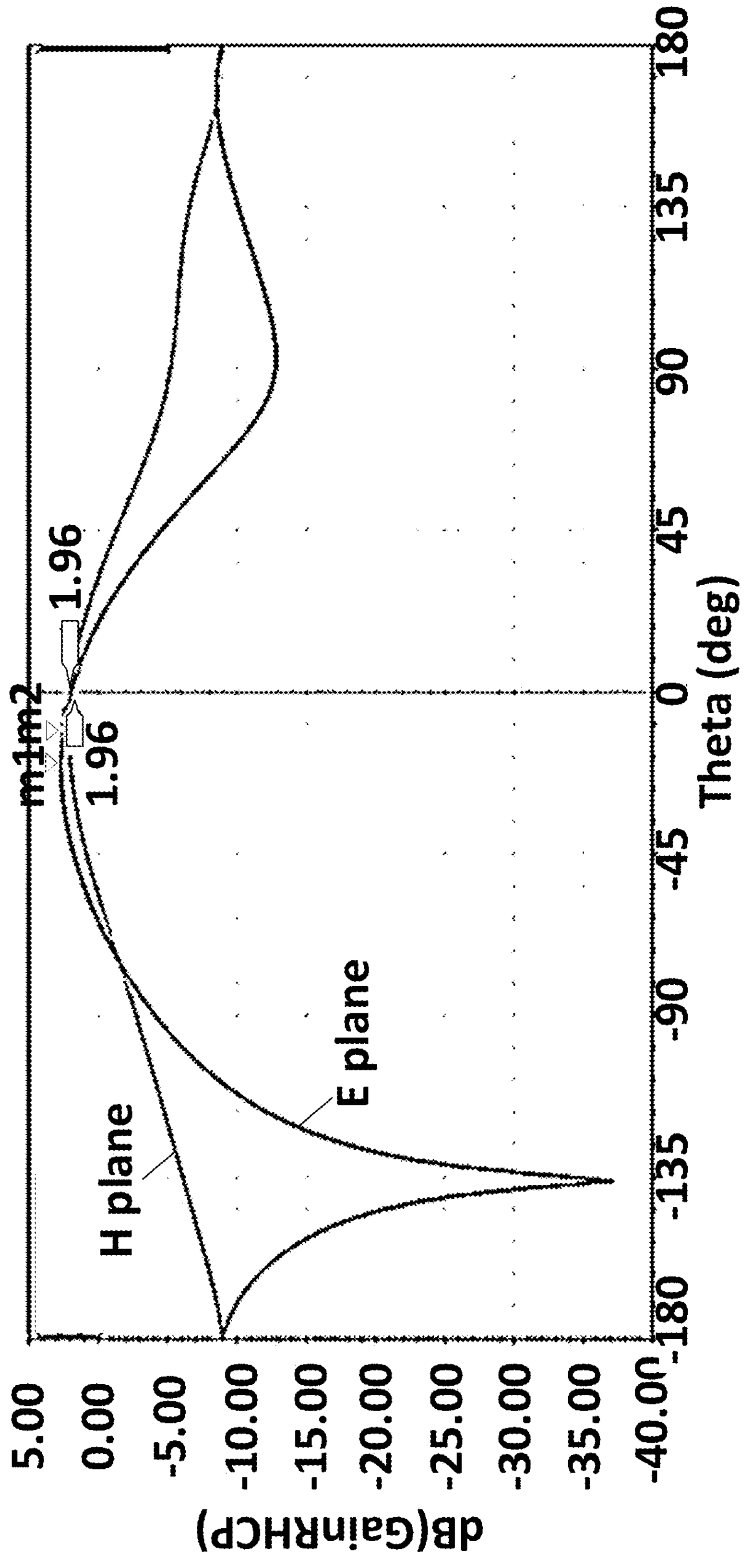
FIG. 10C illustrates a right-handed polarization gain curve of the E plane and the H plane at 3.38 GHz obtained in the antenna depicted in FIG. 9A.

In one specific example, the antenna has an overall thickness of $0.014\lambda_0$, wherein $\lambda_0$ stands for a wavelength in vacuum of a radiation produced by the antenna. FIG. 10A illustrates an S11 graph of the antenna depicted in FIG. 9A. Referring to FIG. 10A, the antenna has a −10 dB impedance bandwidth ranging from 2.33 GHZ to 4.32 GHZ. FIG. 10B illustrates an axial ratio graph of the antenna depicted in FIG. 9A. Referring to FIG. 10B, the axial ratio band width at 3 dB ranges from 3.3 GHZ to 3.8 GHZ, covering an entire n78 band. The minimum value of the axial ratio and the corresponding frequency point in the n78 band are 1.6 dB and 3.38 GHz, respectively. FIG. 10C illustrates a right-handed polarization gain curve of the E plane and the H plane at 3.38 GHz obtained in the antenna depicted in FIG. 9A. Referring to FIG. 10C, the peak values of right-handed polarization gains of the E plane and the H plane are both greater than 2 dBi (2.10 dBi and 2.67 dBi, respectively). Due to the asymmetrical structure of the radiating patch in the present antenna, the right-handed polarization gain curve of the E plane is asymmetrical, and the peak value of the right-handed polarization gain of the E plane does not correspond to theta of zero degree. However, the right-handed polarization gain of the E plane at theta of zero degree is 1.96 dBi, whereas the peak value of the right-handed polarization gain of the E plane is 2.67 dBi, greater than 1.96 dBi by at least 0.761 dBi. The present antenna achieves a complete right circular polarization at n78 band.

The inventors of the present disclosure discover that the performance of the antenna depicted in FIG. 9A is similar to the antenna depicted in FIG. 1A, particularly when the first ring-shaped groove GV1 or the second ring-shaped groove GV2 is spaced apart from an edge of the unitary structure comprising the radiating plate RP and the impedance transformation structure TS by a distance in a range of 1 mm to 7 mm, e.g., 1 mm to 2 mm, 2 mm to 3 mm, 3 mm to 4 mm, 4 mm to 5 mm, 5 mm to 6 mm, or 6 mm to 7 mm.

Figure 11A:
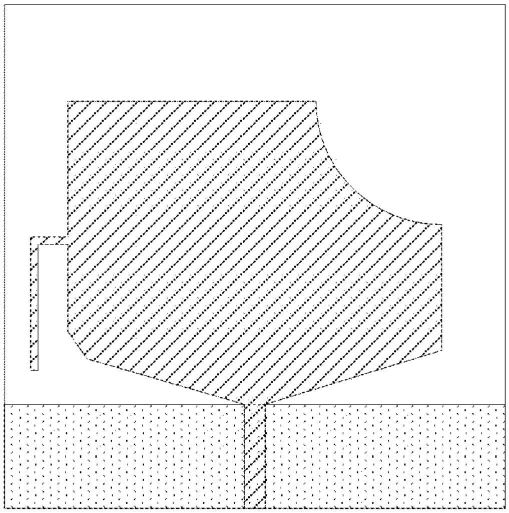
FIG. 11A is a plan view of an antenna in some embodiments according to the present disclosure.
Figure 11B:
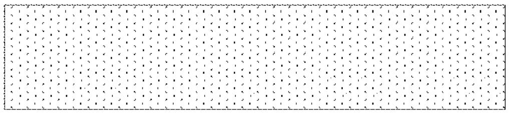
FIG. 11B illustrates the structure of a ground plate in an antenna depicted in FIG. 11A.
Figure 11C:
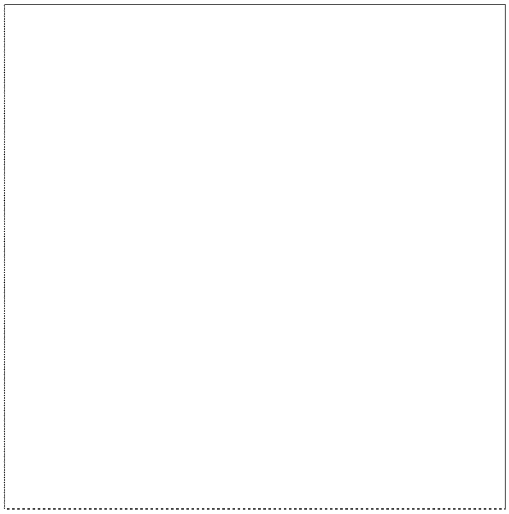
FIG. 11C illustrates the structure of a dielectric layer in an antenna depicted in FIG. 11A.
Figure 11D:
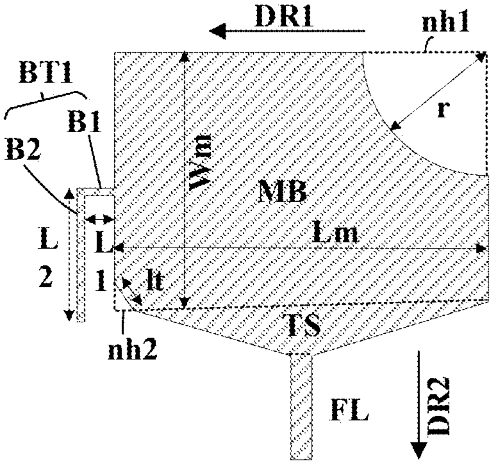
FIG. 11D illustrates the structure of a radiating patch, a microstrip feed line, and an impedance transformation structure in an antenna depicted in FIG. 11A.
Figure 11E:
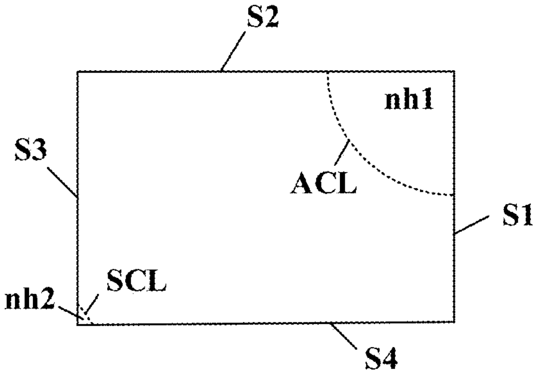
FIG. 11E illustrates a parallelogram shape of a main body of an antenna depicted in FIG. 11A.

FIG. 11A is a plan view of an antenna in some embodiments according to the present disclosure. FIG. 11B illustrates the structure of a ground plate in an antenna depicted in FIG. 11A. FIG. 11C illustrates the structure of a dielectric layer in an antenna depicted in FIG. 11A. FIG. 11D illustrates the structure of a radiating patch, a microstrip feed line, and an impedance transformation structure in an antenna depicted in FIG. 11A. FIG. 11E illustrates a parallelogram shape of a main body of an antenna depicted in FIG. 11A. Referring to FIG. 11A to FIG. 11E, the main body MB in some embodiments has the parallelogram shape with the first notch nh1 truncating a first corner of the parallelogram shape, and a second notch nh2 truncating a second corner of the parallelogram shape. Optionally, the first corner and the second corner are opposite to each other. Optionally, at least a portion of the main body truncated by the first notch nh1 having an arc-shaped contour line ACL. Optionally, the second notch nh2 has a triangular shape.

Referring to FIG. 11E, in some embodiments, the first notch nh1 truncates a first side S1 and a second side S2 of the parallelogram shape. The first branch structure BT1 extends from a third side S3 of the parallelogram shape. The second side S2 connects the first side S1 to the third side S3. The second notch nh2 truncates the third side S3 and the fourth side S4 of the parallelogram shape. The first notch nh1 truncates the first side S1 and the second side S2 of the parallelogram shape.

Referring to FIG. 11D, the first branch structure BT1 in some embodiments includes a first branch B1 connected to the main body MB and a second branch B2 connected to the first branch B1. The first branch B1 is elongated in a first longitudinal direction DR1; and the second branch B2 is elongated in a second longitudinal direction DR2 different from the first longitudinal direction DR1. Optionally, the first longitudinal direction DR1 is perpendicular to the second longitudinal direction DR2. In some embodiments, the first longitudinal direction DR1 is perpendicular to a side of the main body MB connected to the first branch B1; and the second longitudinal direction DR2 is perpendicular to the first longitudinal direction DR1.

In some embodiments, the first branch structure BT1 has a L shape. Referring to FIG. 11D and FIG. 11E, the second branch B2 extends away from the first branch B1 along the second longitudinal direction DR2 from the second side S2 toward the fourth side S4. In one example, the second longitudinal direction DR2 is parallel to the first side S1 or the third side S3, and the first longitudinal direction DR1 in one example is parallel to the second side S2 or the fourth side S4.

In some embodiments, the first branch B1 has a length L1 of 1.5 mm to 5.5 mm, e.g., 1.5 mm to 2.0 mm, 2.0 mm to 2.5 mm, 2.5 mm to 3.0 mm, 3.0 mm to 3.5 mm, 3.5 mm to 4.0 mm, 4.0 mm to 4.5 mm, 4.5 mm to 5.0 mm, or 5.0 mm to 5.5 mm. In one example, the first branch B1 has a length L1 of 3.5 mm. Optionally, the second branch B2 has a length L2 of 5 mm to 30 mm, e.g., 5 mm to 10 mm, 10 mm to 15 mm, 15 mm to 20 mm, 20 mm to 25 mm, or 25 mm to 30 mm. In one example, the second branch B2 has a length L2 of 12.5 mm.

In some embodiments, a ratio of the length L1 to the length L2 is in a range of 2:3 to 2:15, e.g., 2:3 to 1:2, 1:2 to 2:5, 2:5 to 1:3, 1:3 to 2:7, 2:7 to 1:4, 1:4 to 2:9, 2:9 to 1:5, 1:5 to 2:11, 2:11 to 1:6, 1:6 to 2:13, 2:13 to 1:7, or 1:7 to 2:15. In one example, the ratio of the length L1 to the length L2 is 3.5:12.5.

In some embodiments, at least a portion of the main body truncated by the first notch nh1 having an arc-shaped contour line ACL. In one example, the first notch nh1 has a partial circle shape, and the arc-shaped contour line ACL is a partial circle arc line. In another example, the first notch nh1 has a quarter circle shape, and the arc-shaped contour line ACL is a quarter circle arc line. In some embodiments, the arc-shaped contour line ACL has a radius of r.

In some embodiments, at least a portion of the main body truncated by the second notch nh2 having a straight contour line SCL connecting two sides (e.g., S3 and S4) of the parallelogram shape PS. In one example, the second notch nh2 has a triangular shape. In some embodiments, the straight contour line SCL has a length lt.

In some embodiments, a ratio of the length lt to the radius r is in a range of 1:2 to 1:8. e.g., 1:2 to 1:3, 1:3 to 1:4, 1:4 to 1:5, 1:5 to 1:6, 1:6 to 1:7, or 1:7 to 1:8. In one example, the ratio of the length lt to the radius r is 3.2:12. In one example, the radius r is 12 mm. In another example, the length lt is 3.2 mm.

In some embodiments, a ratio of the length lt to the length L2 is in a range of 1:2 to 1:8, e.g., 1:2 to 1:3, 1:3 to 1:4, 1:4 to 1:5, 1:5 to 1:6, 1:6 to 1:7, or 1:7 to 1:8. In one example, the ratio of the length L2 to the radius r is 3.2:12. In one example, the length L2 is 12.5 mm. In another example, the length lt is 3.2 mm.

Figure 12A:
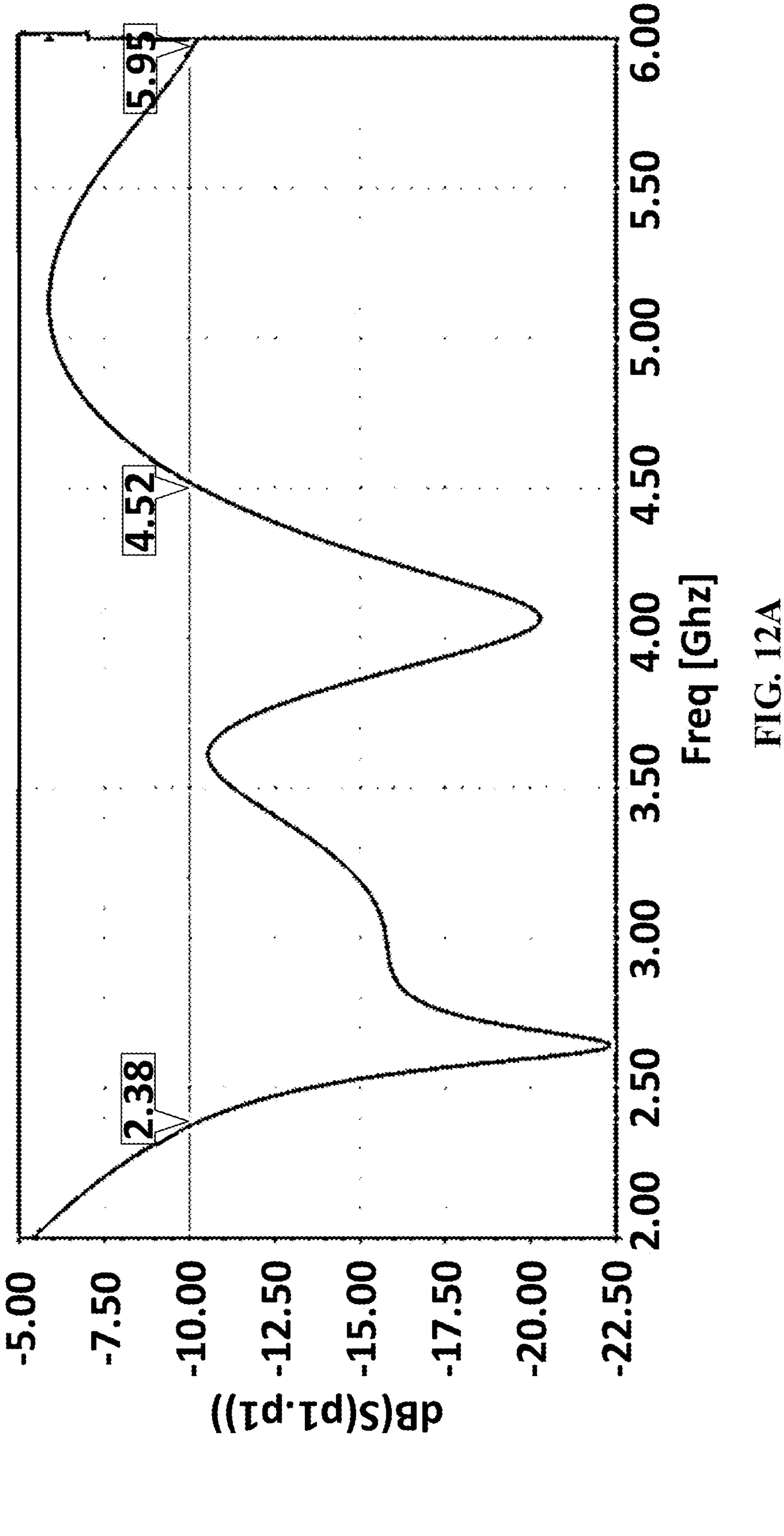
FIG. 12A illustrates an S11 graph of the antenna depicted in FIG. 11A.
Figure 12B:
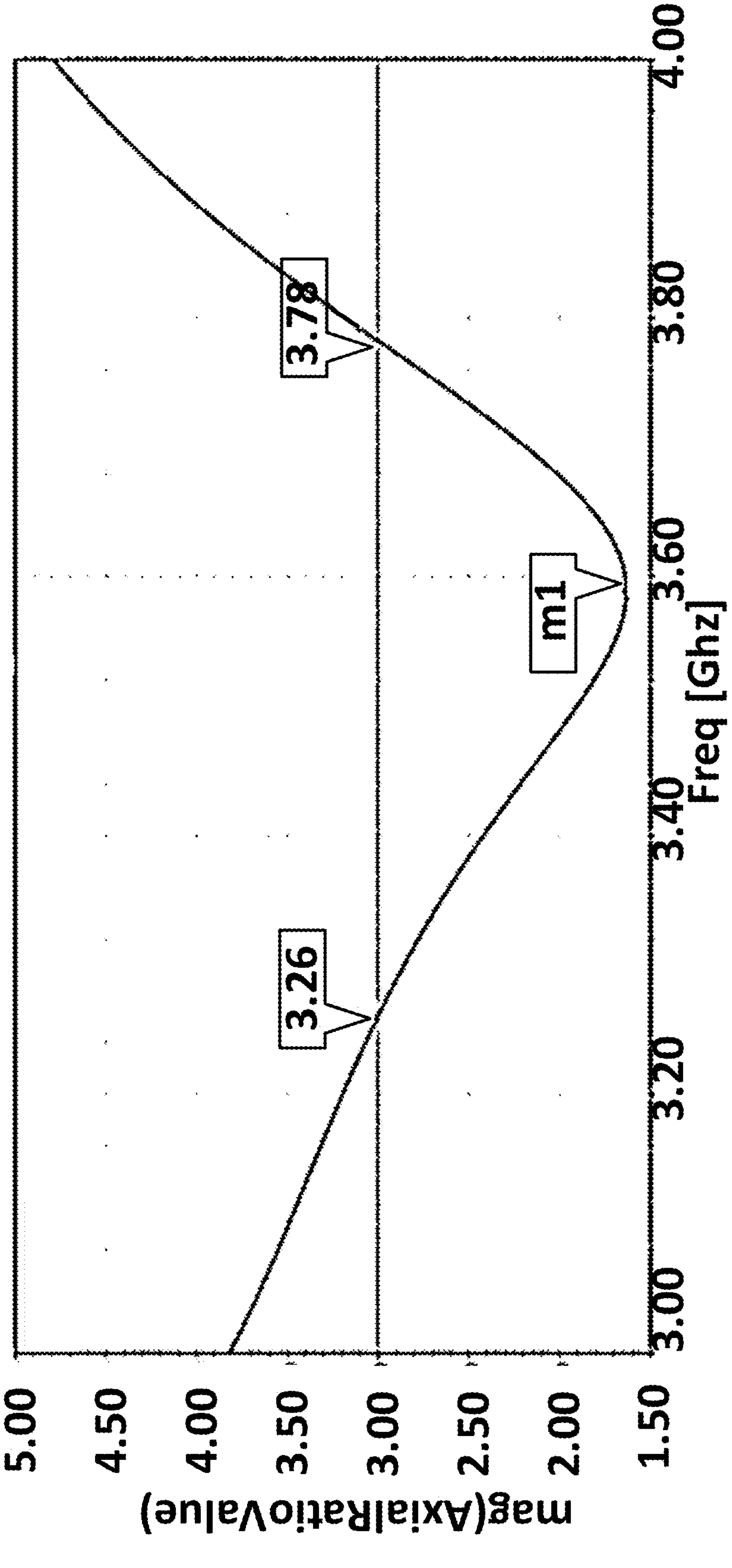
FIG. 12B illustrates an axial ratio graph of the antenna depicted in FIG. 11A.
Figure 12C:
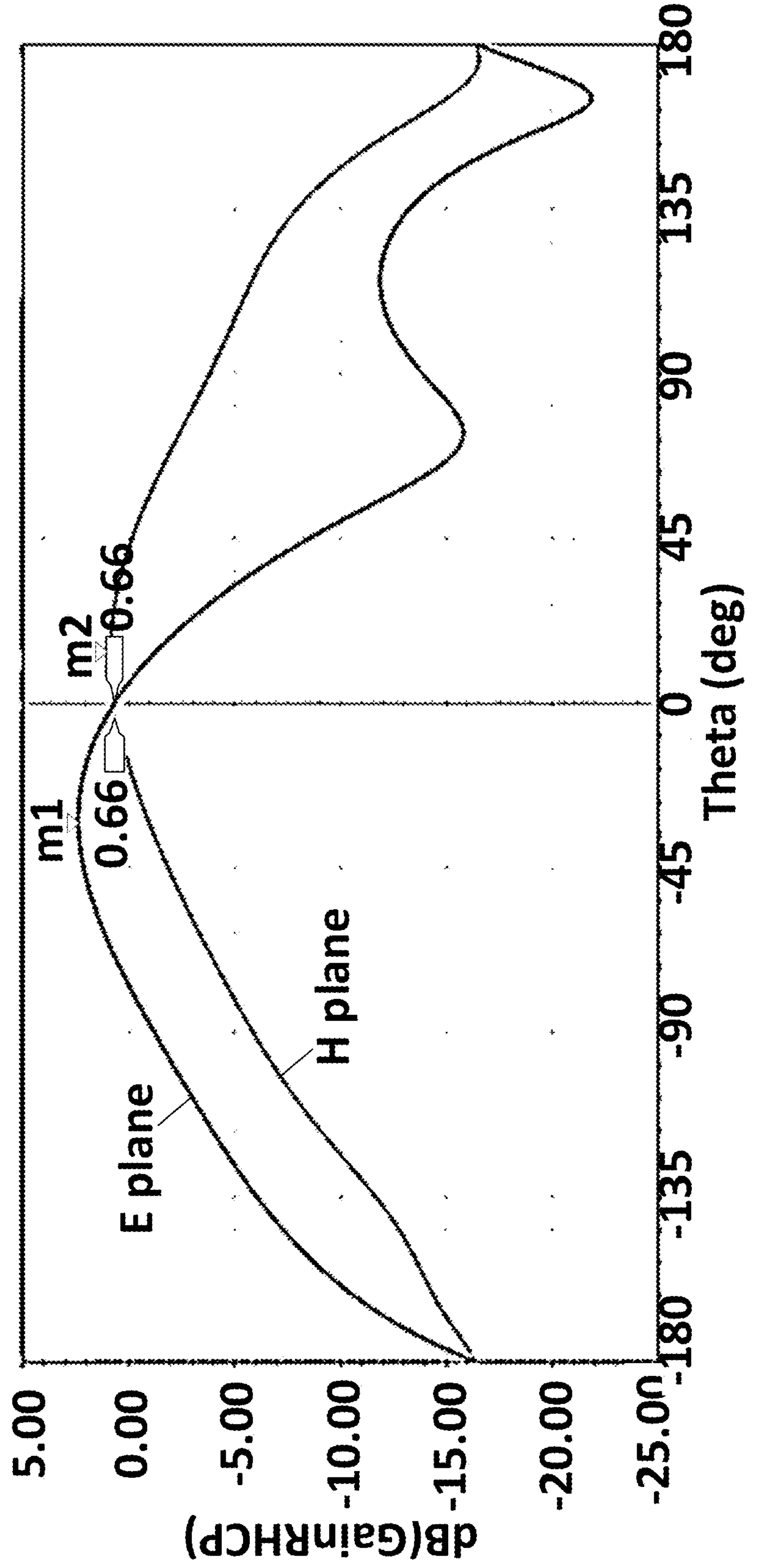
FIG. 12C illustrates a right-handed polarization gain curve of the E plane and the H plane at 3.59 GHz obtained in the antenna depicted in FIG. 11A.

In one specific example, the antenna has an overall thickness of $0.014\lambda_0$, wherein $\lambda_0$ stands for a wavelength in vacuum of a radiation produced by the antenna. FIG. 12A illustrates an S11 graph of the antenna depicted in FIG. 11A. Referring to FIG. 12A, the antenna has a −10 dB impedance bandwidth ranging from 2.38 GHz to 4.52 GHz. FIG. 12B illustrates an axial ratio graph of the antenna depicted in FIG. 11A. Referring to FIG. 12B, the axial ratio band width at 3 dB ranges from 3.26 GHz to 3.78 GHZ, covering an entire n78 band. The minimum value of the axial ratio and the corresponding frequency point in the n78 band are 1.6 dB and 3.59 GHZ, respectively. FIG. 12C illustrates a right-handed polarization gain curve of the E plane and the H plane at 3.59 GHz obtained in the antenna depicted in FIG. 11A. Referring to FIG. 12C, the peak values of right-handed polarization gains of the E plane and the H plane are 2.36 dBi and 0.8 dBi, respectively. Due to the asymmetrical structure of the radiating patch in the present antenna, the right-handed polarization gain curve of the E plane is asymmetrical, and the peak value of the right-handed polarization gain of the E plane does not correspond to theta of zero degree. However, the right-handed polarization gain of the E plane at theta of zero degree is 0.66 dBi, whereas the peak value of the right-handed polarization gain of the E plane is 2.36 dBi, greater than 0.66 dBi by at least 1.7 dBi. The present antenna achieves a complete right circular polarization at n78 band.

The inventors of the present disclosure discover that the performance of the antenna depicted in FIG. 11A is similar to the antenna depicted in FIG. 1A, particularly when the length lt of the straight contour line SCL as a result of truncating by the second notch nh2 is in a range of 1.4 mm to 4.2 mm, e.g., 1.4 mm to 2.0 mm, 2.0 mm to 2.5 mm, 2.5 mm to 3.0 mm, 3.0 mm to 3.5 mm, or 3.5 mm to 4.2 mm.

Figure 13A:
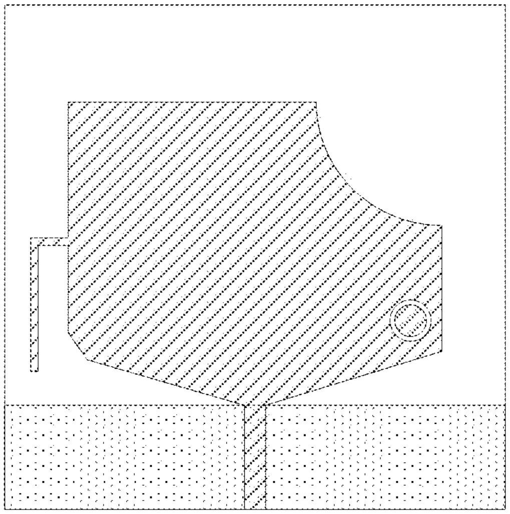
FIG. 13A is a plan view of an antenna in some embodiments according to the present disclosure.
Figure 13B:
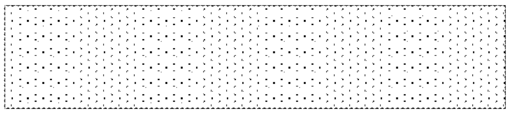
FIG. 13B illustrates the structure of a ground plate in an antenna depicted in FIG. 13A.
Figure 13C:
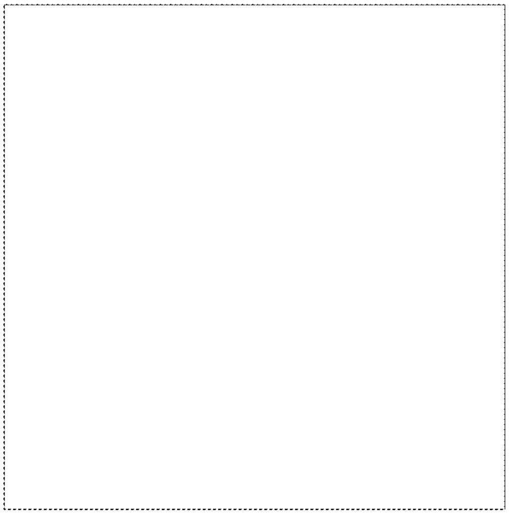
FIG. 13C illustrates the structure of a dielectric layer in an antenna depicted in FIG. 13A.
Figure 13D:
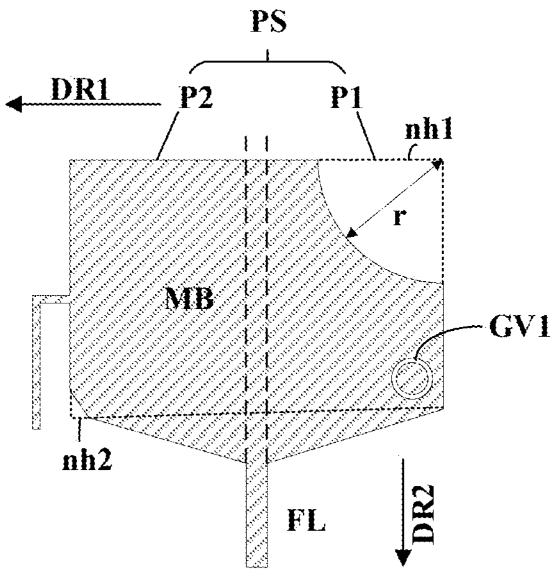
FIG. 13D illustrates the structure of a radiating patch, a microstrip feed line, and an impedance transformation structure in an antenna depicted in FIG. 13A.

FIG. 13A is a plan view of an antenna in some embodiments according to the present disclosure. FIG. 13B illustrates the structure of a ground plate in an antenna depicted in FIG. 13A. FIG. 13C illustrates the structure of a dielectric layer in an antenna depicted in FIG. 13A. FIG. 13D illustrates the structure of a radiating patch, a microstrip feed line, and an impedance transformation structure in an antenna depicted in FIG. 13A. As compared to the antenna depicted in FIG. 11A, the antenna depicted in FIG. 13A further includes a first ring-shaped groove GV1 extending through the main body MB. As shown in FIG. 13D, a virtual extension of the microstrip feed line FL partitions the parallelogram shape PS into two portions including a first portion P1 and a second portion P2. The first ring-shaped groove GV1 extends through a portion (the first portion P1) of the parallelogram shape PS that is truncated by the first notch nh1. In one example, the first ring-shaped groove GV1 has an inside diameter of 3.2 mm and an outside diameter of 4.0 mm. In another example, along the first longitudinal direction DR1, the first ring-shaped groove GV1 is spaced apart from an edge of the unitary structure comprising the radiating plate RP and the impedance transformation structure TS by a distance of 3 mm. In another example, along the second longitudinal direction DR2, the first ring-shaped groove GV1 is spaced apart from the edge of the unitary structure comprising the radiating plate RP and the impedance transformation structure TS by a distance of 3 mm.

Figure 14A:
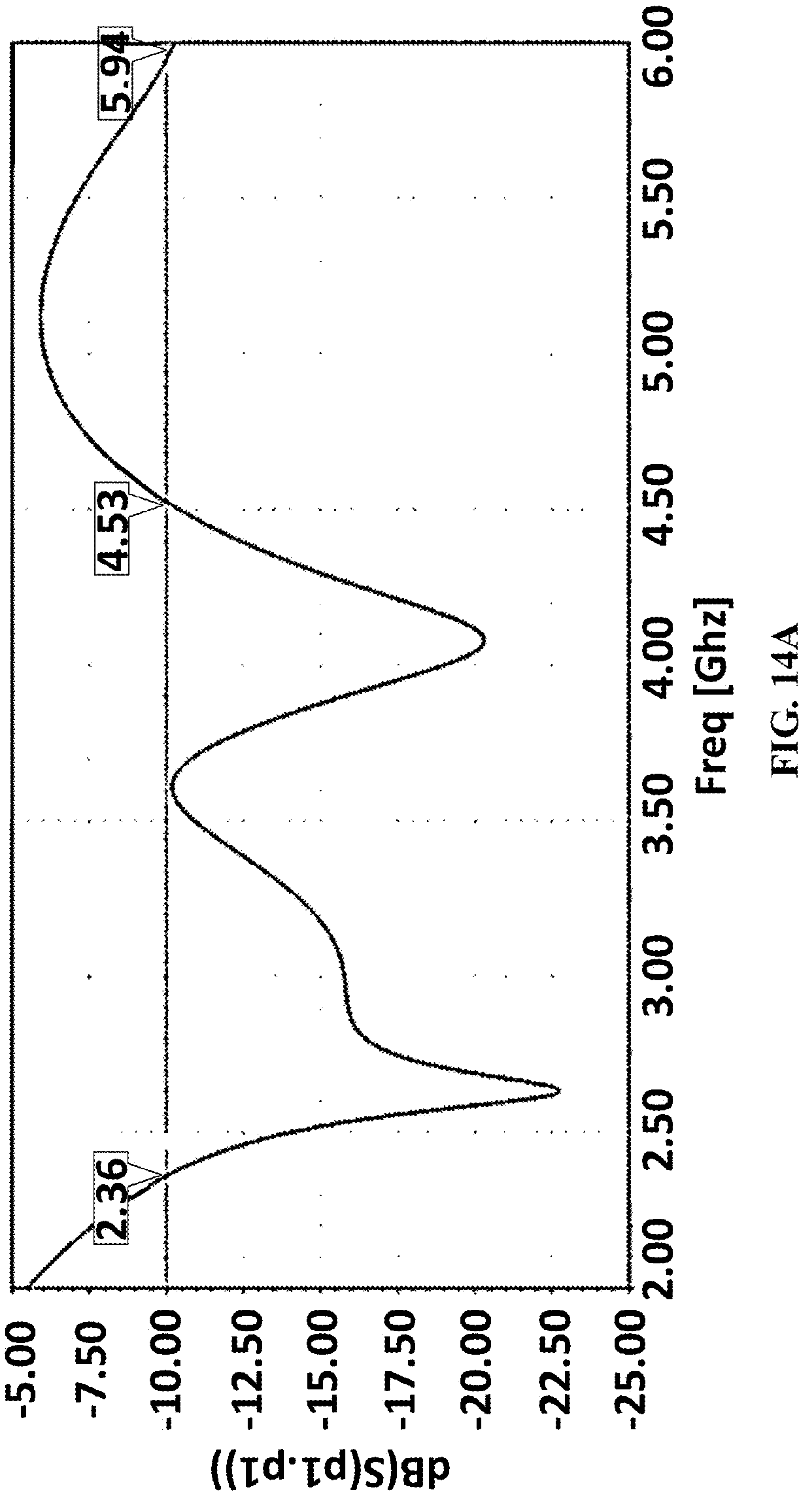
FIG. 14A illustrates an S11 graph of the antenna depicted in FIG. 13A.
Figure 14B:
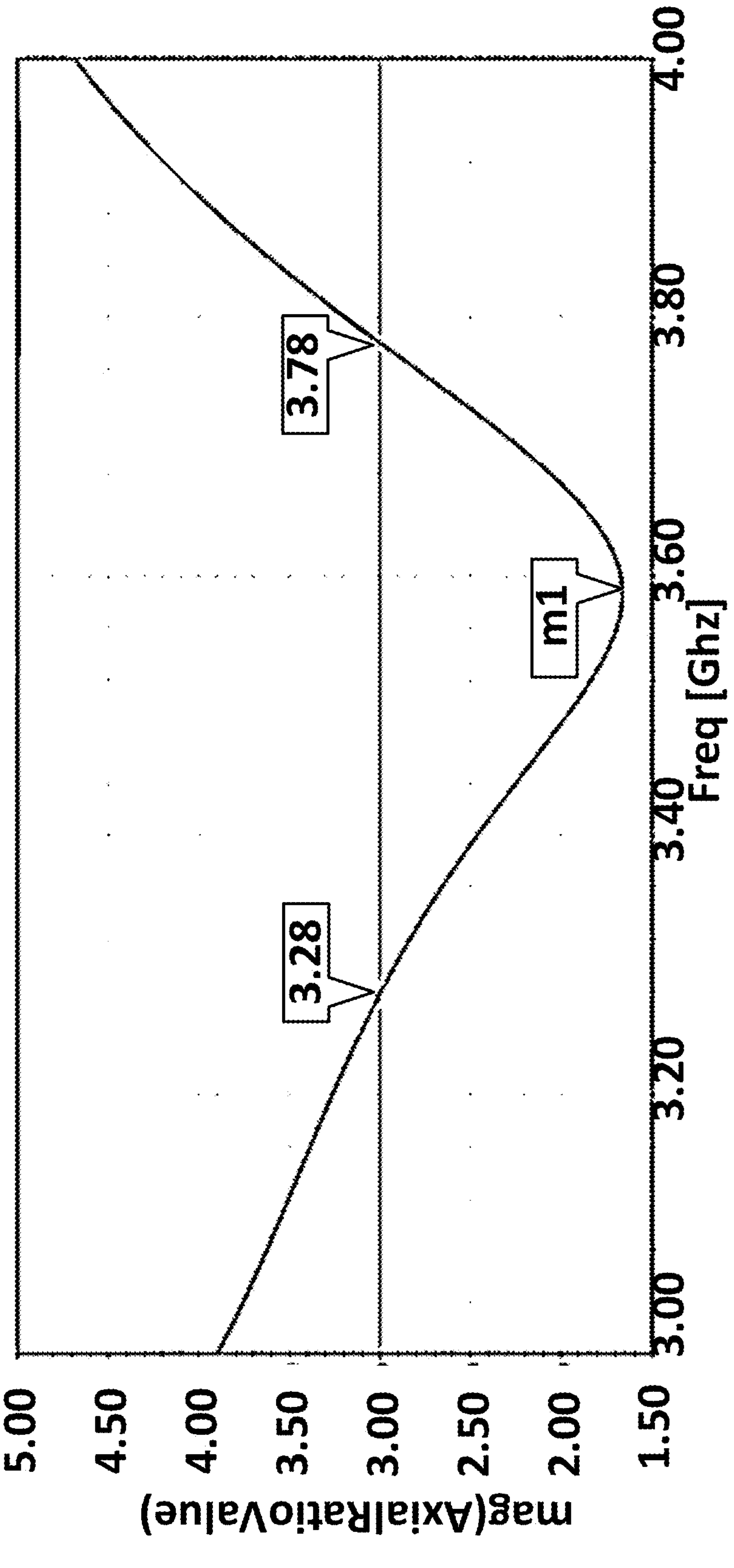
FIG. 14B illustrates an axial ratio graph of the antenna depicted in FIG. 13A.
Figure 14C:
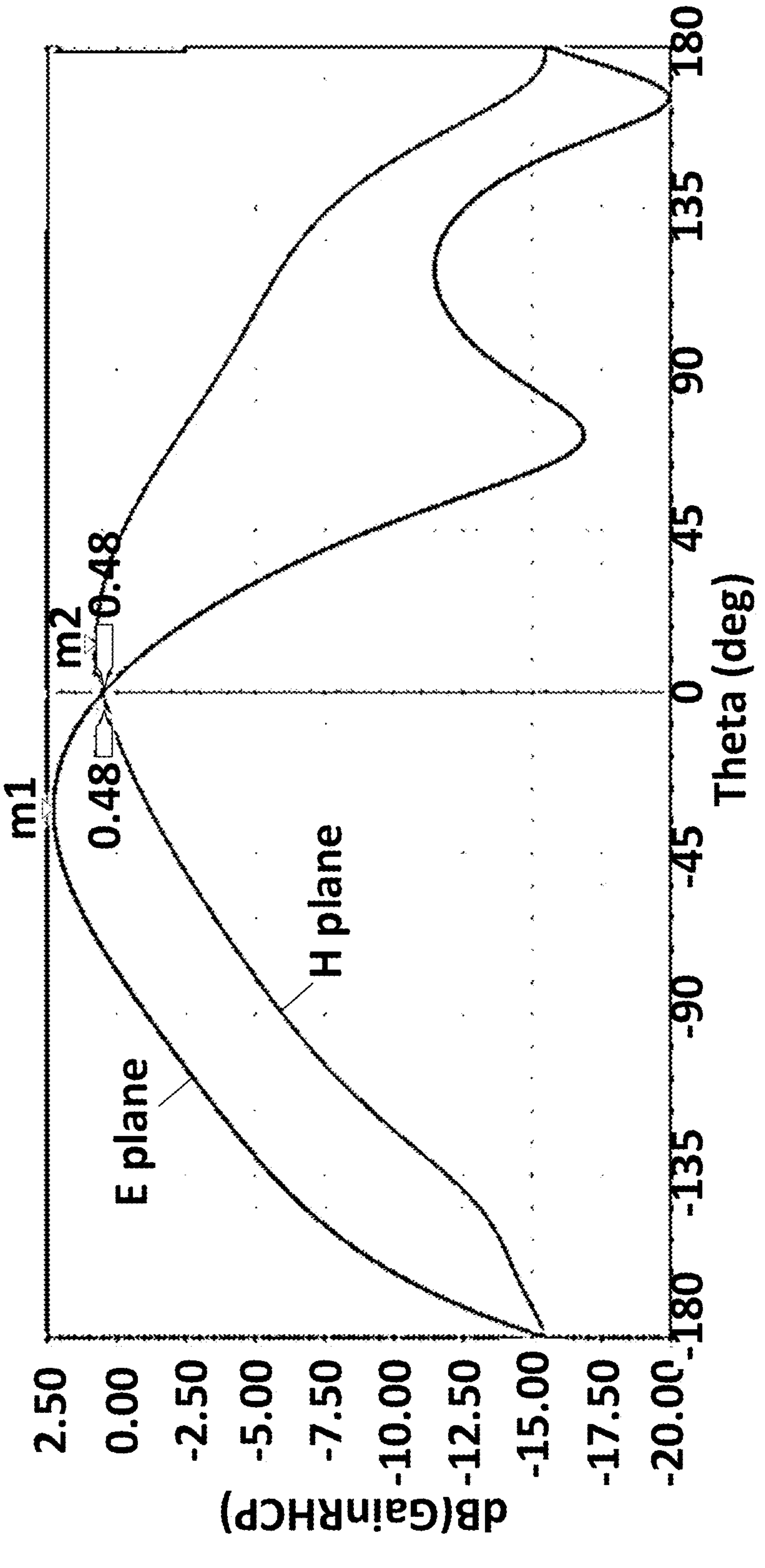
FIG. 14C illustrates a right-handed polarization gain curve of the E plane and the H plane at 3.59 GHz obtained in the antenna depicted in FIG. 13A.

In one specific example, the antenna has an overall thickness of $0.014\lambda_0$, wherein $\lambda_0$ stands for a wavelength in vacuum of a radiation produced by the antenna. FIG. 14A illustrates an S11 graph of the antenna depicted in FIG. 13A. Referring to FIG. 14A, the antenna has a −10 dB impedance bandwidth ranging from 2.36 GHz to 4.53 GHZ. FIG. 14B illustrates an axial ratio graph of the antenna depicted in FIG. 13A. Referring to FIG. 14B, the axial ratio band width at 3 dB ranges from 3.28 GHz to 3.78 GHZ, covering an entire n78 band. The minimum value of the axial ratio and the corresponding frequency point in the n78 band are 1.7 dB and 3.59 GHZ, respectively. FIG. 14C illustrates a right-handed polarization gain curve of the E plane and the H plane at 3.59 GHz obtained in the antenna depicted in FIG. 13A. Referring to FIG. 14C, the peak values of right-handed polarization gains of the E plane and the H plane are 2.27 dBi and 0.7 dBi, respectively. Due to the asymmetrical structure of the radiating patch in the present antenna, the right-handed polarization gain curve of the E plane is asymmetrical, and the peak value of the right-handed polarization gain of the E plane does not correspond to theta of zero degree. However, the right-handed polarization gain of the E plane at theta of zero degree is 0.48 dBi, whereas the peak value of the right-handed polarization gain of the E plane is 2.27 dBi, greater than 0.48 dBi by at least 1.8 dBi. The present antenna achieves a complete right circular polarization at n78 band.

The inventors of the present disclosure discover that the performance of the antenna depicted in FIG. 13A is similar to the antenna depicted in FIG. 11A, particularly when the first ring-shaped groove GV1 is spaced apart from an edge of the unitary structure comprising the radiating plate RP and the impedance transformation structure TS by a distance in a range of 1 mm to 7 mm, e.g., 1 mm to 2 mm, 2 mm to 3 mm, 3 mm to 4 mm, 4 mm to 5 mm, 5 mm to 6 mm, or 6 mm to 7 mm.

Figure 15A:
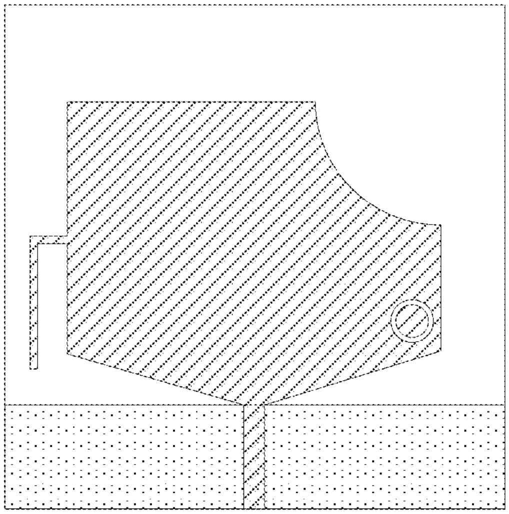
FIG. 15A is a plan view of an antenna in some embodiments according to the present disclosure.
Figure 15B:
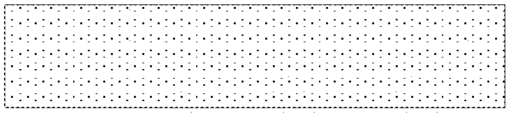
FIG. 15B illustrates the structure of a ground plate in an antenna depicted in FIG. 15A.
Figure 15C:
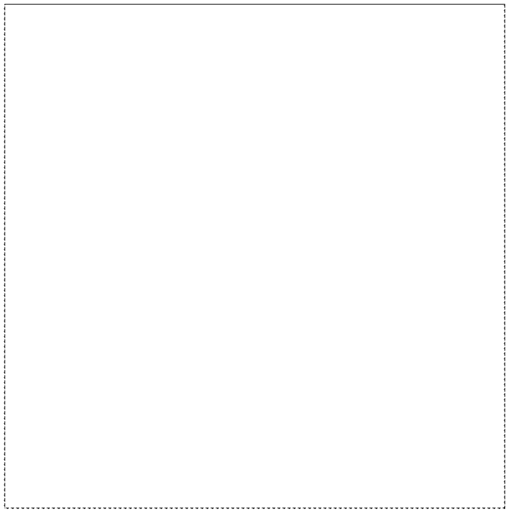
FIG. 15C illustrates the structure of a dielectric layer in an antenna depicted in FIG. 15A.
Figure 15D:
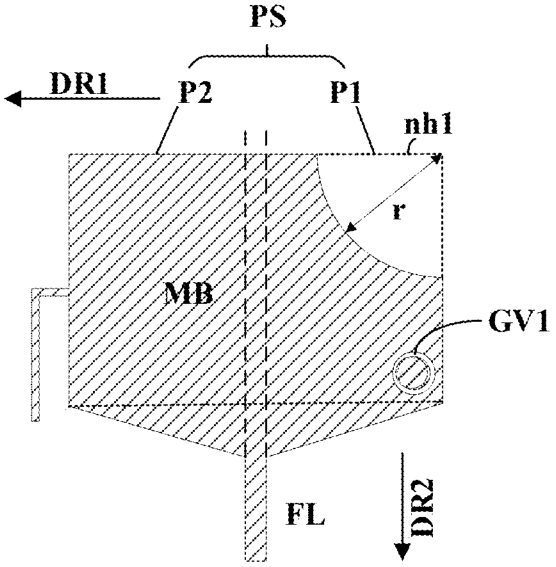
FIG. 15D illustrates the structure of a radiating patch, a microstrip feed line, and an impedance transformation structure in an antenna depicted in FIG. 15A.

FIG. 15A is a plan view of an antenna in some embodiments according to the present disclosure. FIG. 15B illustrates the structure of a ground plate in an antenna depicted in FIG. 15A. FIG. 15C illustrates the structure of a dielectric layer in an antenna depicted in FIG. 15A. FIG. 15D illustrates the structure of a radiating patch, a microstrip feed line, and an impedance transformation structure in an antenna depicted in FIG. 15A. As compared to the antenna depicted in FIG. 13A, the antenna depicted in FIG. 15A does not have a second notch nh2.

Figure 16A:
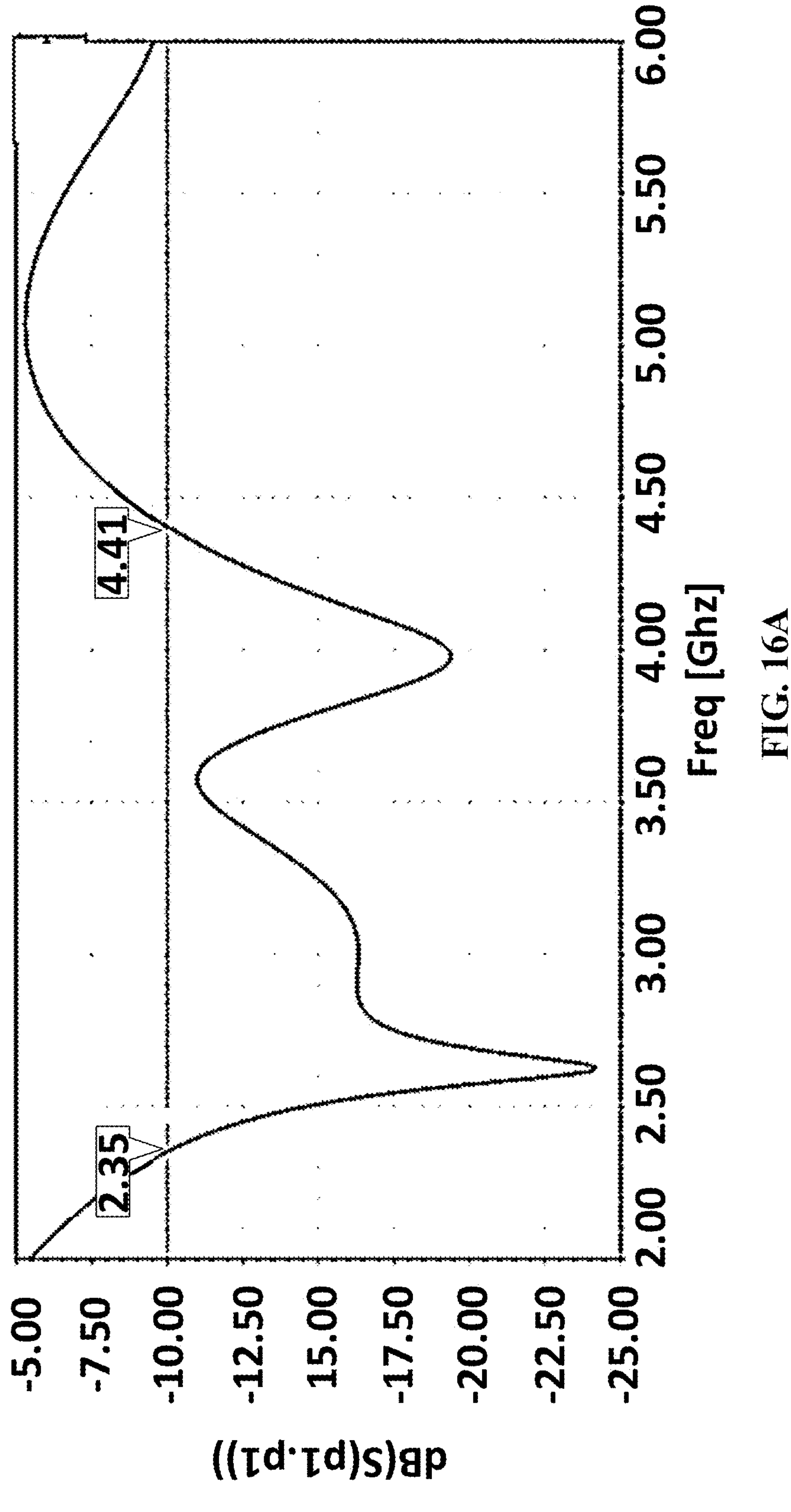
FIG. 16A illustrates an S11 graph of the antenna depicted in FIG. 15A.
Figure 16B:
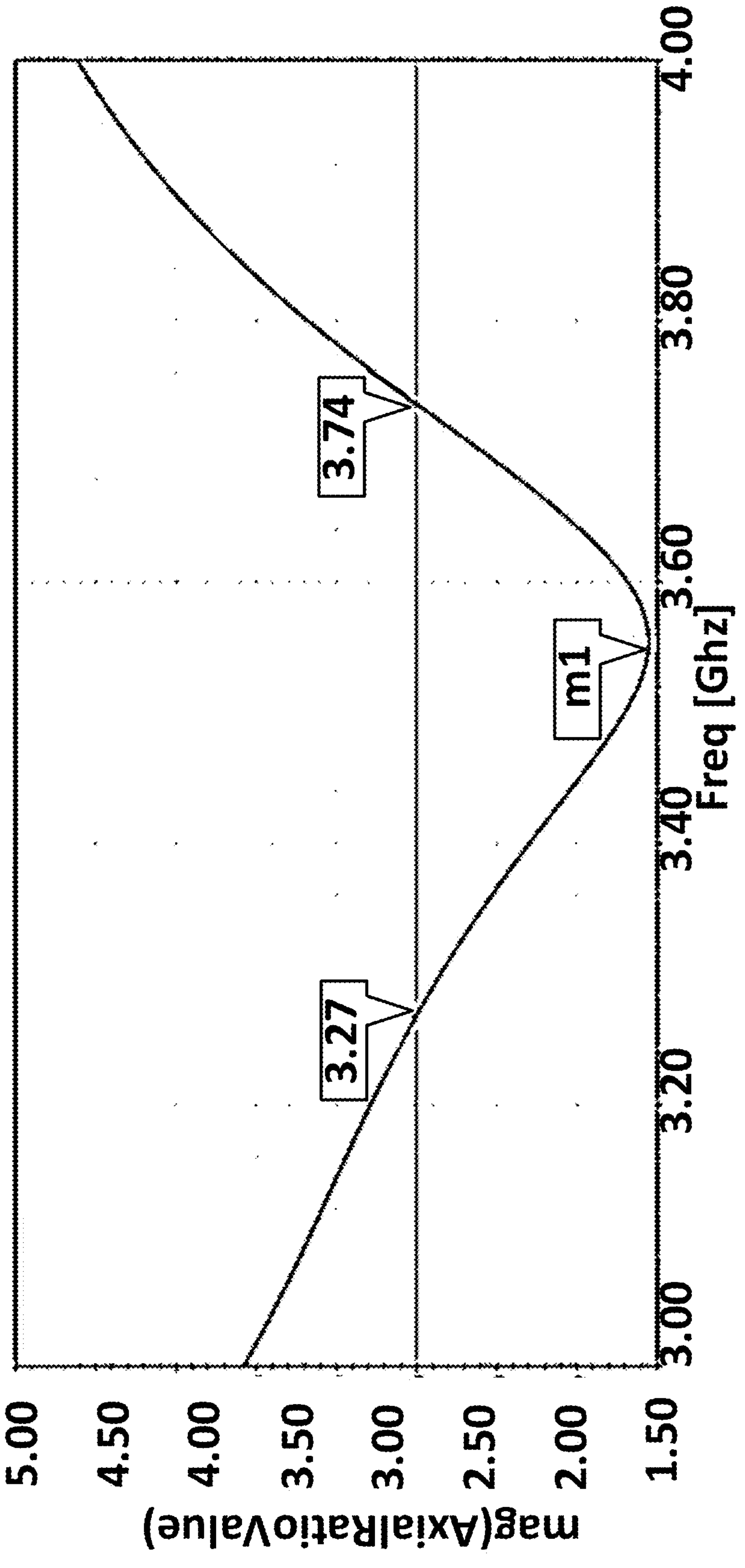
FIG. 16B illustrates an axial ratio graph of the antenna depicted in FIG. 15A.
Figure 16C:
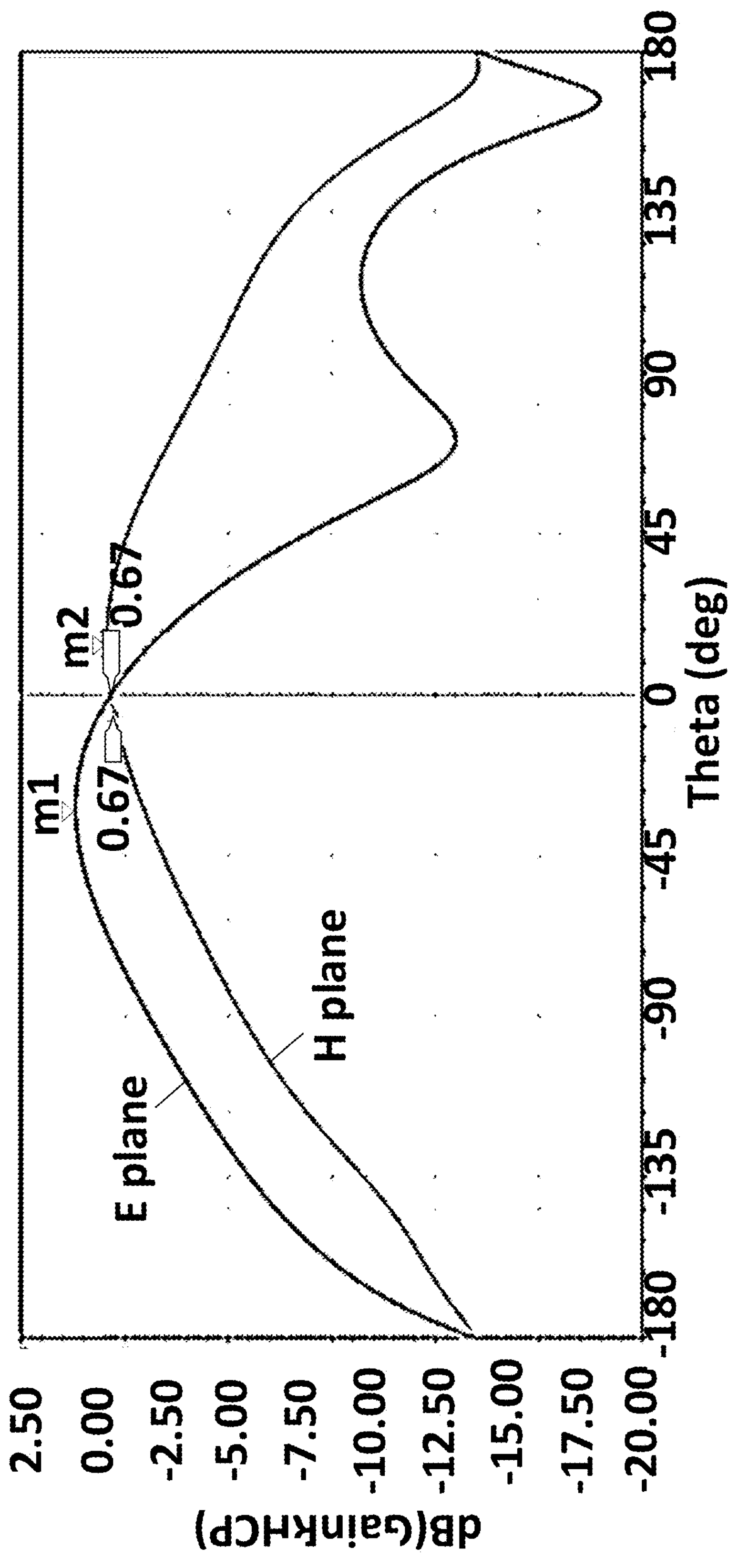
FIG. 16C illustrates a right-handed polarization gain curve of the E plane and the H plane at 3.55 GHz obtained in the antenna depicted in FIG. 15A.

In one specific example, the antenna has an overall thickness of $0.014\lambda_0$, wherein $\lambda_0$ stands for a wavelength in vacuum of a radiation produced by the antenna. FIG. 16A illustrates an S11 graph of the antenna depicted in FIG. 15A. Referring to FIG. 16A, the antenna has a −10 dB impedance bandwidth ranging from 2.35 GHz to 4.41 GHZ. FIG. 16B illustrates an axial ratio graph of the antenna depicted in FIG. 15A. Referring to FIG. 16B, the axial ratio band width at 3 dB ranges from 3.27 GHz to 3.74 GHZ, covering an entire n78 band. The minimum value of the axial ratio and the corresponding frequency point in the n78 band are 1.6 dB and 3.55 GHZ, respectively. FIG. 16C illustrates a right-handed polarization gain curve of the E plane and the H plane at 3.55 GHz obtained in the antenna depicted in FIG. 15A. Referring to FIG. 16C, the peak values of right-handed polarization gains of the E plane and the H plane are 2.37 dBi and 0.87 dBi, respectively. Due to the asymmetrical structure of the radiating patch in the present antenna, the right-handed polarization gain curve of the E plane is asymmetrical, and the peak value of the right-handed polarization gain of the E plane does not correspond to theta of zero degree. However, the right-handed polarization gain of the E plane at theta of zero degree is 0.67 dBi, whereas the peak value of the right-handed polarization gain of the E plane is 2.37 dBi, greater than 0.67 dBi by at least 1.7 dBi. The present antenna achieves a complete right circular polarization at n78 band.

The inventors of the present disclosure discover that the performance of the antenna depicted in FIG. 15A is similar to the antenna depicted in FIG. 13A.

In another aspect, the present disclosure provide an electronic apparatus. In some embodiments, the electronic apparatus includes an antenna described herein, and one or more circuits. In one example, the electronic apparatus is a display apparatus. In some embodiments, the display apparatus includes a display panel and an antenna described herein connected to the display panel. Examples of appropriate display apparatuses include, but are not limited to, an electronic paper, a mobile phone, a tablet computer, a television, a monitor, a notebook computer, a digital album, a GPS, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An antenna, comprising:

a ground plate;

a dielectric layer on the ground plate; and a microstrip feed line and a radiating patch on a side of the dielectric layer away from the ground plate, the radiating patch being coupled to the microstrip feed line and configured to receive a signal from the microstrip feed line;

wherein the radiating patch comprises a main body having a parallelogram shape with a first notch truncating a corner of the parallelogram shape, at least a portion of the main body truncated by the first notch having an arc-shaped contour line; and the radiating patch further comprises a first branch structure disconnected from the microstrip feed line;

wherein the main body is asymmetric;

the first notch does not have a symmetric counterpart with respect to an axis or a plane perpendicular to the main body and intersecting the main body and the ground plate; and the first branch structure does not have a symmetric counterpart with respect to an axis or a plane perpendicular to the main body and intersecting the main body and the ground plate.

2. The antenna of claim 1, wherein an orthographic projection of the ground plate on the dielectric layer at least partially overlaps with an orthographic projection of the microstrip feed line on the dielectric layer.

3. The antenna of claim 1, wherein the first branch structure extends from a side of the parallelogram shape that is not truncated by the first notch.

4. The antenna of claim 1, wherein the first notch truncates a first side and a second side of the parallelogram shape;

the first branch structure extends from a third side of the parallelogram shape; and the second side connects the first side to the third side.

5. The antenna of claim 1, wherein the first branch structure comprises a first branch connected to the main body and a second branch connected to the first branch, the first branch and the second branch being disconnected from the micro strip line;

the first branch is elongated in a first longitudinal direction; and the second branch is elongated in a second longitudinal direction different from the first longitudinal direction.

6. The antenna of claim 5, wherein the first longitudinal direction is perpendicular to a side of the main body connected to the first branch; and the second longitudinal direction is perpendicular to the first longitudinal direction.

7. The antenna of claim 1, further comprising a second branch structure;

wherein the first branch structure and the second branch structure are connected to two opposite sides of the main body.

8. The antenna of claim 1, wherein the first branch structure has a T shape.

9. The antenna of claim 7, wherein the first branch structure has a T shape; and the second branch structure has a L shape.

10. The antenna of claim 1, wherein the first notch has a partial circle shape.

11. The antenna of claim 1, wherein the main body has the parallelogram shape with the first notch truncating a first corner of the parallelogram shape, and a second notch truncating a second corner of the parallelogram shape.

12. The antenna of claim 11, wherein the first corner and the second corner are opposite to each other.

13. The antenna of claim 11, wherein the second notch has a triangular shape.

14. The antenna of claim 11, wherein the first notch truncates a first side and a second side of the parallelogram shape;

the first branch structure extends from a third side of the parallelogram shape;

the second side connects the first side to the third side; and the second notch truncates the third side of the parallelogram shape.

15. The antenna of claim 1, further comprising a first ring-shaped groove extending through the main body.

16. The antenna of claim 15, wherein a virtual extension of the microstrip feed line partitions the parallelogram shape into two portions; and the first ring-shaped groove extends through a portion of the parallelogram shape that is truncated by the first notch.

17. The antenna of claim 15, further comprising a second ring-shaped groove extending through the main body;

wherein a virtual extension of the microstrip feed line partitions the parallelogram shape into two portions;

the first ring-shaped groove extends through a first portion of the parallelogram shape that is truncated by the first notch; and the second ring-shaped groove extends through a second portion of the parallelogram shape different from the first portion.

18. The antenna of claim 1, further comprising an impedance transformation structure configured to perform impedance matching;

wherein the impedance transformation structure connects the microstrip feed line to the radiating patch; and the impedance transformation structure has a trapezoidal shape having a long side connected to the radiating patch and a short side connected to the microstrip feed line.

19. The antenna of claim 18, wherein the impedance transformation structure, the microstrip feed line, and the radiating patch are parts of a unitary structure.

20. An electronic apparatus, comprising the antenna of claim 1.

* * * * *